United States Patent
Katsuragi

(10) Patent No.: US 10,150,880 B2
(45) Date of Patent: Dec. 11, 2018

(54) INK SET, PRINTING METHOD, AND PRINTING APPARATUS

(71) Applicant: Koji Katsuragi, Kanagawa (JP)

(72) Inventor: Koji Katsuragi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/454,686

(22) Filed: Mar. 9, 2017

(65) Prior Publication Data

US 2017/0267889 A1    Sep. 21, 2017

(30) Foreign Application Priority Data

Mar. 18, 2016  (JP) .................................. 2016-055887
Sep. 1, 2016   (JP) .................................. 2016-170629

(51) Int. Cl.
| | |
|---|---|
| *B41J 2/01* | (2006.01) |
| *C09D 11/40* | (2014.01) |
| *C09D 11/106* | (2014.01) |
| *C09D 11/107* | (2014.01) |
| *C09D 11/322* | (2014.01) |
| *C09D 11/38* | (2014.01) |

(52) U.S. Cl.
CPC .................. *C09D 11/40* (2013.01); *B41J 2/01* (2013.01); *C09D 11/106* (2013.01); *C09D 11/107* (2013.01); *C09D 11/322* (2013.01); *C09D 11/38* (2013.01)

(58) Field of Classification Search
None
See application file for complete search history.

(56) References Cited

U.S. PATENT DOCUMENTS

| | | | |
|---|---|---|---|
| 9,457,606 B2 | 10/2016 | Katsuragi | |
| 2005/0117009 A1* | 6/2005 | Kawaguchi | B41J 3/4078 347/102 |
| 2006/0189712 A1 | 8/2006 | Kondo | |
| 2010/0098918 A1 | 4/2010 | Kagata et al. | |
| 2011/0050791 A1 | 3/2011 | Kagata et al. | |
| 2011/0279517 A1 | 11/2011 | Katsuragi | |
| 2014/0292899 A1* | 10/2014 | Kagata | C09D 11/30 347/20 |

(Continued)

FOREIGN PATENT DOCUMENTS

| | | |
|---|---|---|
| EP | 2 180 023 A1 | 4/2010 |
| JP | 3562754 | 6/2004 |

(Continued)

OTHER PUBLICATIONS

Extended Search Report dated Jun. 29, 2017 in European Patent Application No. 17160461.4.

*Primary Examiner* — Erica Lin
(74) *Attorney, Agent, or Firm* — Oblon, McClelland, Maier & Neustadt, L.L.P.

(57) ABSTRACT

Provided is an ink set including: a first ink that is white and contains water, hollow resin particles, and at least one organic solvent; and a second ink that contains water and at least one organic solvent and is to be applied on a first image formed with the first ink to form a second image, wherein an average thickness difference (A–B) between an average thickness (A) of the first image before the second ink is applied and an average thickness (B) of a white region in the first image after the second image is formed is 1 μm or greater but 3 μm or less.

14 Claims, 2 Drawing Sheets

(56) References Cited

U.S. PATENT DOCUMENTS

2015/0024178 A1 1/2015 Kagata et al.
2015/0291820 A1 10/2015 Kagata et al.
2016/0177116 A1 6/2016 Katsuragi et al.

FOREIGN PATENT DOCUMENTS

| JP | 4877224 | 12/2011 |
| JP | 2012-25883 A | 2/2012 |
| JP | 2012-25884 A | 2/2012 |
| JP | 2015-129298 A | 7/2015 |
| JP | 2015-131964 A | 7/2015 |
| JP | 2016-117872 | 6/2016 |

\* cited by examiner

INK SET, PRINTING METHOD, AND PRINTING APPARATUS

CROSS-REFERENCE TO RELATED APPLICATIONS

The present application claims priority under 35 U.S.C. § 119 to Japanese Patent Application No. 2016-055887, filed Mar. 18, 2016 and Japanese Patent Application No. 2016-170629, filed Sep. 1, 2016. The contents of which are incorporated herein by reference in their entirety.

BACKGROUND OF THE INVENTION

Field of the Invention

The present disclosure relates to an ink set, a printing method, and a printing apparatus.

Description of the Related Art

Inkjet printing methods have become widespread because inkjet printing methods are advantageous over other printing methods in that inkjet printing methods have simple processes, can be easily accommodated to full-color operations, and can provide high-resolution images even when used on apparatuses having simple configurations.

Common methods for forming reflection images on transparent print media (base materials) based on printing with white inks and chromatic color inks include a "surface printing" method of firstly forming a white foundation on a transparent base material with a white ink and then forming an image with chromatic color inks such as yellow, magenta, cyan, and black in order for the final image to be seen from the side of the printed surface and a "backing printing" method of forming an image with chromatic color inks on a transparent base material and coating the image with a white ink in order for the final image to be seen from the side of the back surface through the transparent base material.

Also inkjet printing methods can form such images as described above by using white inks and various chromatic color inks. White inks used in inkjet printing methods have a good visibility on transparent print media and print media having a low brightness. Particularly, when the white inks are used in combination with chromatic color inks, inkjet printing methods can provide full-color images that are as clear as images printed on white print media. Therefore, inkjet printing methods are one of effective methods.

Hence, there is provided an inkjet white ink containing hollow resin particles having an external diameter of 0.1 µm or greater but 1 µm or less and an internal diameter of 0.05 µm or greater but 0.8 µm or less, insoluble in water-soluble solvents, and chemically non-reactive with binder resin components (see, e.g., Japanese Patent No. 3562754).

Further, Japanese Patent No. 4877224 describes that surface tensions of white inks are lower than surface tensions of color inks.

SUMMARY OF THE INVENTION

According to one aspect of the present disclosure, an ink set includes a first ink that is white and contains water, hollow resin particles, and at least one organic solvent, and a second ink that contains water and at least one organic solvent and is to be applied on a first image formed with the first ink to form a second image. An average thickness difference (A–B) between an average thickness (A) of the first image before the second ink is applied and an average thickness (B) of a white region in the first image after the second image is formed is 1 µm or greater but 3 µm or less.

DESCRIPTION OF THE EMBODIMENTS (Ink Set)

Figure 1:
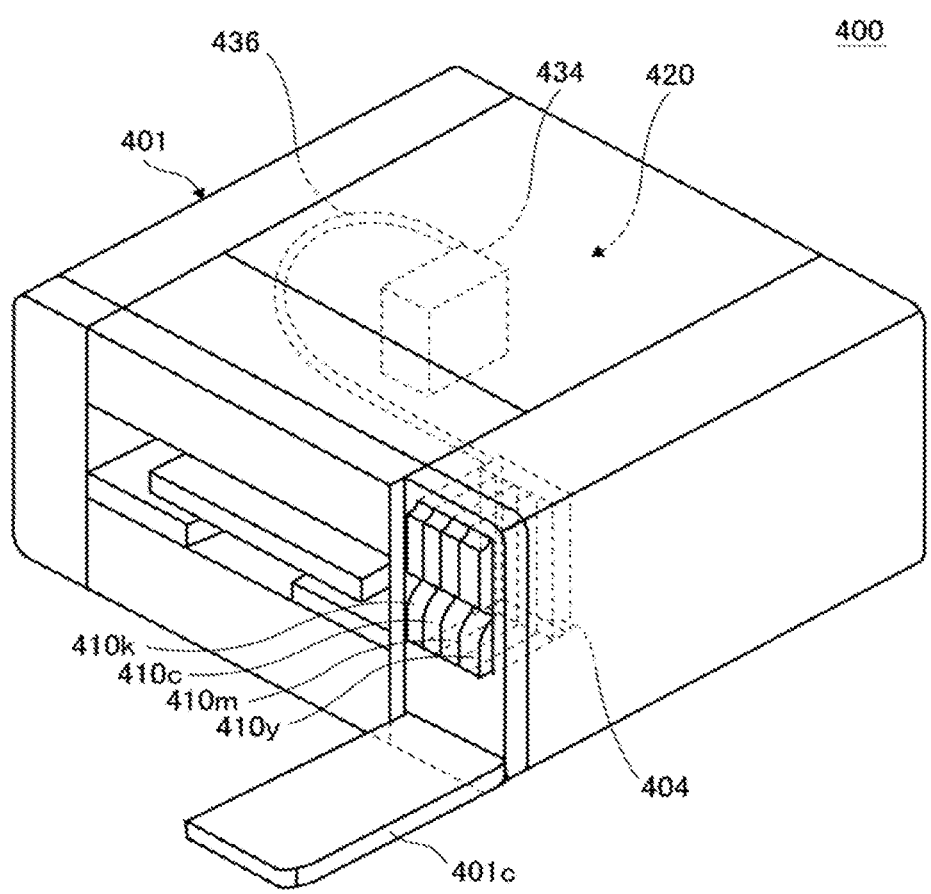
FIG. 1 is a perspective view illustrating an example of an inkjet printing apparatus.

The ink set of the present disclosure includes a first ink that is white and contains water, hollow resin particles, and at least one organic solvent, and a second ink that contains water and at least one organic solvent and is to be applied on a first image formed with the first ink to form a second image. An average thickness difference (A–B) between an average thickness (A) of the first image before the second ink is applied and an average thickness (B) of a white region in the first image after the second image is formed is 1 µm or greater but 3 µm or less.

The ink set of the present disclosure is based on a finding that according to existing techniques, the hollow resin particles crush (to decrease luminosity $L^*$) when the shell resin of the hollow resin particles dissolves upon contact with an organic solvent having a SP value similar to the SP value of the shell resin.

The present disclosure has an object to provide an ink set including a white ink and capable of suppressing crushing of hollow resin particles contained in the white ink (and decrease of luminosity $L^*$) and providing a highly gloss image.

The present disclosure can provide an ink set including a white ink and capable of suppressing crushing of hollow resin particles contained in the white ink (and decrease of luminosity $L^*$) and providing a highly gloss image.

What is needed in the present disclosure is that an average thickness difference (A–B) between an average thickness (A) of the first image before the second ink is applied and an average thickness (B) of a white region in the first image after the second image is formed is 1 µm or greater but 3 µm or less.

According to an ink prescription and a printing method described below, a change in the average thickness of the white region in the first image when the first ink and the second ink contact each other can be the average thickness difference (A–B) of 1 µm or greater but 3 µm or less. Therefore, even when the first ink and the second ink contact each other, the first image, which is white, can be maintained as a white image.

When the average thickness difference (A–B) is 1 µm or greater, the surface of the first image is smooth when the first ink and the second ink contact each other. This leads to enhancement of image glossiness. Meanwhile, when the average thickness difference (A–B) is 3 µm or less, the first image, which is white, can be maintained as a white image.

The average thickness (A) of the first image and the average thickness (B) of the white region in the first image after the second image is formed can be obtained by cutting an image sample, which is a quadrangle solid image formed of a dot pattern and having a size of 3 cm on all sides, with a cutter to obtain a cross-section, observing the cross-section with a SEM (available from JEOL Ltd., JSL-6510A), measuring the thickness of the sample at arbitrary 5 positions, and averaging the measured values.

In the present disclosure, a first image formed with the first ink is defined as having a white color when the first image has a luminosity (L*) of 20 or higher.

The luminosity (L*) can be measured from an image sample, which is a quadrangle solid image formed of a dot pattern printed with only the first ink and having a size of 3 cm on all sides, using a spectrocolorimeter (available from X-Rite Inc., 939).

Average thickness decrease (i.e., average thickness difference (A-B) of 1 μm or greater) in the white region to occur when the first ink and the second ink contact each other is a problem unique to hollow resin particles as a white coloring material. When white pigments that are not hollow, such as titanium oxide, are used, average thickness decrease does not occur, or the average thickness difference (A-B) is less than 1 μm even if average thickness decrease occurs.

One important means for achieving the ink set designing of the average thickness difference (A-B) of 1 μm or greater but 3 μm or less is the resin SP value of the hollow resin particles and the SP value of the organic solvent contained in the ink, as described below.

The average thickness (A) of the first image before the second ink is applied is preferably 5 μm or greater but 50 μm or less and more preferably 10 μm or greater but 30 μm or less.

When the average thickness (A) of the first image is 5 μm or greater, the first image formed with the white first ink can be maintained as a white image. Meanwhile, when the average thickness (A) of the first image is 50 μm or less, productivity of image formation can be improved. In formation of the first image, the white first ink may be printed a plurality of times before application of the second ink, so long as the average thickness (A) of the first image is in the mentioned value range.

In the present disclosure, the second image is formed with the second ink on the first image formed with the white first ink. In this case, what matters is wettability of the second ink on the first image. When wettability of the second ink is high, adjoining dots of the second ink coalesce and generate an image feathering state called beading. On the other hand, when wettability of the second ink is poor, dots of the second ink do not spread and cannot create the intended color tone.

Hence, in the present disclosure, wettability is expressed by the property "contact angle". The contact angle of the second ink on the first image is preferably 15 degrees or greater but 30 degrees or less and more preferably 20 degrees or greater but 30 degrees or less.

When the contact angle of the second ink is 15 degrees or greater but 30 degrees or less, it is possible to prevent occurrence of beading in which dots of the second ink coalesce and to spread dots of the second ink to enable an image having the intended color tone.

In the present disclosure, it is preferable that the solubility parameter (hereinafter may also be referred to as "SP value") (X) of a mixture solution of the organic solvent and water contained in the first ink and the SP value (Y) of a mixture solution of the organic solvent and water contained in the second ink be both 17.0 $(cal/cm^3)^{0.5}$ or greater but 20.2 $(cal/cm^3)^{0.5}$ or less.

When the mixture solutions of the organic solvent and water have a SP value of 17.0 $(cal/cm^3)^{0.5}$ or greater, it is possible to suppress crushing of the hollow resin particles. Meanwhile, when the mixture solutions of the organic solvent and water have a SP value of 20.2 $(cal/cm^3)^{0.5}$ or less, it is possible to prevent a poor fixability due to failure in drying.

It is preferable that a mixture solution of 2 or more organic solvents contained in the first ink or the second ink have a SP value of 11.0 $(cal/cm^3)^{0.5}$ or greater but 17.4 $(cal/cm^3)^{0.5}$ or less.

When the mixture solution of 2 or more organic solvents has a SP value of 11.0 $(cal/cm^3)^{0.5}$ or greater, it is possible to suppress crushing of the hollow resin particles. Meanwhile, when the mixture solution has a SP value of 17.4 $(cal/cm^3)^{0.5}$ or less, it is possible to prevent a poor fixability due to failure in drying.

The SP value of the mixture solution of the organic solvent(s) and water contained in the ink can be calculated according to a formula below.

SP value$(cal/cm^3)^{0.5}$ of the mixture solution of the organic solvent(s) and water contained in the ink=[SP value of organic solvent $A$×volume fraction of organic solvent $A$]+[SP value of organic solvent $B$×volume fraction of organic solvent $B$]+ . . . +[SP value of water×volume fraction of water]

The SP value is a numeral expression of how easy it is for substances to dissolve with each other. The SP value is expressed as a square root of a mutually attracting force, i.e., cohesive energy density (CED) between molecules of the substances. The CED refers to an amount of energy needed to evaporate 1 mL of the substances.

The SP value can be calculated according to a formula (B) below based on Fedors method.

$$\text{SP value (solubility parameter)}=(\text{CED value})^{1/2}=(E/V)^{1/2} \quad \text{Formula (B)}$$

In formula (B), E represents a molecular cohesive energy (cal/mol) and V represents a molecular volume $(cm^3/mol)$. E and V are represented by formulae (C) and (D) below, where $\Delta ei$ represents an evaporation energy of a group of atoms and $\Delta vi$ represents a molar volume of the group of atoms.

$$E=\Sigma\Delta ei \quad \text{formula (C)}$$

$$V=\Sigma\Delta vi \quad \text{formula (D)}$$

There are some theories about how to calculate the SP value. The present disclosure employs the Fedors method commonly used.

Data described in Imoto, Minoru. *SECCHAKU NO KISO RIRON*, Kobunshi Kankokai, chapter 5 can be used as the data of the evaporation energy $\Delta ei$ and molar volume $\Delta vi$ of each group of atoms in the calculation method described above.

Fedors, R. F. *Polym. Eng. Sci.* 14, 147, 1974 can be referred to for any substances, of which data, such as —$CF_3$ group are not presented.

For reference only, the SP value represented by formula (B) can be converted to a unit $(J/cm^3)^{1/2}$ by multiplication of 2.046, and can be converted to a SI unit $(J/m^3)^{1/2}$ by multiplication of 2,046.

In the present disclosure, the organic solvent encompasses substances that are functionally classified also as permeating agents or foam suppressors. In the present disclosure, only those organic solvents that are contained in the ink in an amount of 3 percent by mass or greater of the total amount of the ink are counted in the calculation of the SP value.

A mixed SP value difference (X−Y) is preferably −1 or greater but 3 or less, where X represents a mixed SP value, which is the SP value of the mixture solution of the organic solvent and water contained in the first ink, and Y represents a mixed SP value, which is the SP value of the mixture solution of the organic solvent and water contained in the second ink.

When the mixed SP value difference (X–Y) is −1 or greater, the average thickness of the first image is not decreased by the organic solvent contained in the first image itself even when the white first ink is printed a plurality of times. When the mixed SP value difference (X–Y) is 3 or less, the average thickness of the first image formed with the white first image is not decreased by the second ink, either.

A SP value difference (C–D) is preferably −3 or greater but 3 or less, where C represents the SP value of the organic solvent of which proportion in the first ink is the highest except water, and D represents the SP value of the organic solvent of which proportion in the second ink is the highest except water.

When the SP value difference (C–D) is −3 or greater but 3 or less, it is possible to suppress the hollow resin particles from being dissolved by the organic solvents.

In the present disclosure, the absolute value of a difference between dynamic surface tensions of the first ink and the second ink is preferably 0 mN/m or greater but 12 mN/m or less and more preferably 5 mN/m or greater but 10 mN/m or less, where the dynamic surface tensions are measured by a maximum foaming pressure method in a life time of 1,500 ms.

When the absolute value of the difference between the dynamic surface tensions is 0 mN/m or greater but 12 mN/m or less, the second ink has a good wettability to the first ink and can realize dot formation and the aforementioned average thickness of the white region in the first image.

The dynamic surface tensions are values measured by the maximum foaming pressure method at 25 degrees C., and can be measured with, for example, a dynamic surface tensiometer SITA DYNO TESTER (available from SITA Messtechnik GmbH).

The "life time" is the life span of bubbles generated by the maximum foaming pressure method and is also referred to as "bubble life time", which indicates the length of the time taken from when a new interface is generated in the tip of a probe of a dynamic surface tensiometer until when the generated interface reaches the maximum foaming pressure.

The dynamic surface tensions of both of the first ink and the second ink measured by the maximum foaming pressure method in a life time of 1,500 Ins are preferably 20 mN/m or greater but 35 mN/m or less.

In the preferable value range, the inks can be suitably levelized on print media and the drying time of the inks can be shortened.

<First Ink>

The first ink is a white ink, contains water, hollow resin particles, and an organic solvent, preferably contains a wax, and further contains other components as needed.

<Hollow Resin Particles>

The hollow resin particles are formed of a hollow internal layer and an external layer coated with a resin. The external diameter (volume average particle diameter) of the hollow resin particles is preferably 0.1 μm or greater but 1 μm or less. The internal diameter of the hollow resin particles is preferably 0.05 μm or greater but 0.8 μm or less.

Examples of the method for measuring the volume average particle diameter include a method using a laser scattering/diffraction-type particle size measuring instrument.

The internal layer of the hollow resin particles is hollow. Therefore, the hollow resin particles as an ink have a specific gravity of around 1 and do not settle out over time unlike titanium dioxide.

In terms of avoiding settling over time, the average thickness of the external layer of the hollow resin particles is preferably 10 percent or greater but 20 percent or less of the whole size of the hollow resin particles.

The hollow resin particles express a white color and have an excellent opacity owing to refractive index difference after drying between the air space inside the particles and the polymer layer forming the shell of the particles.

The degree of hollowness of the hollow resin particles is not particularly limited, may be appropriately selected depending on the intended purpose, and is preferably 20 percent or greater but 80 percent or less and more preferably 35 percent or greater but 70 percent or less. When the degree of hollowness of the hollow resin particles is 20 percent or greater, the degree of whiteness of a printed image can be improved. When the degree of hollowness of the hollow resin particles is 80 percent or less, the hollow resin particles can be suppressed to a small particle diameter and can be suppressed from settling out in the white ink.

Examples of the method for measuring the degree of hollowness include a method using a scanning electron microscope (SEM). The degree of hollowness is the ratio between the capacity of a sphere to which a hollow resin particle is approximated based on the external diameter of the particle and the capacity of a sphere to which the hollow resin particle is approximated based on the internal diameter (which is the diameter of the hollow portion) of the particle. The degree of hollowness can be represented by formula (1) below.

Degree of hollowness (%)=(internal capacity of hollow resin particle/capacity of hollow resin particle)×100   Formula (1)

Internal capacity of hollow resin particle=$4\pi/3\times$(internal diameter of hollow resin particle)$^3$ Capacity of hollow resin particle=$4\pi/3\times$(external diameter of hollow resin particle)$^3$ When the SP value of the shell resin of the hollow resin particles is similar to the SP value of the organic solvent contained in the first ink, the shell resin of the hollow resin particles is likely to be dissolved by the organic solvent contained in the first ink. Hence, it is preferable to secure a difference between the SP value of the shell resin of the hollow resin particles and the SP value of the organic solvent contained in the first ink (or the SP value of mixed solvents when 2 or more organic solvents are contained). It is more preferable that the absolute value of the difference between the SP values be 1 or greater but 10 or less.

The shell resin of the hollow resin particles is preferably a styrene-acrylic copolymer resin or a methyl methacrylate resin in terms of the relation with the refractive index of the internal air space layer. However, these resins may be changed to a thermoplastic resin in consideration of heat driability.

The hollow resin particles may be an appropriately synthesized product or a commercially available product.

The method for synthesizing the hollow resin particles is not particularly limited and may be appropriately selected depending on the intended purpose. A preferable method is a so-called emulsion polymerization method of stirring vinyl monomers, a surfactant, a polymerization initiator, and an aqueous dispersion medium under heating in a nitrogen atmosphere to form a hollow resin particle emulsion.

Examples of the vinyl monomers include nonionic monofunctional ethylene unsaturated monomers and bifunctional vinyl monomers.

Examples of the nonionic monofunctional ethylene unsaturated monomers include styrene, vinyl toluene, ethylene, vinyl acetate, vinyl chloride, vinylidene chloride, acrylonitrile, (meth)acrylamide, and (meth)acrylic acid ester. One of these nonionic monofunctional ethylene unsaturated monomers may be used alone or two or more of these nonionic monofunctional ethylene unsaturated monomers may be used in combination. Among these nonionic monofunctional ethylene unsaturated monomers, (meth) acrylic acid ester is preferable.

Examples of the (meth)acrylic acid ester include methyl acrylate, methyl methacrylate, ethyl (meth)acrylate, butyl (meth)acrylate, 2-hydroxyethyl methacrylate, 2-ethylhexyl (meth)acrylate, benzyl (meth)acrylate, lauryl (meth)acrylate, oleyl (meth)acrylate, palmityl (meth)acrylate, and stearyl (meth)acrylate.

Examples of the bifunctional vinyl monomers include divinyl benzene, allyl methacrylate, ethylene glycol dimethacrylate, 1,5-butanediol dimethacrylate, diethylene glycol dimethacrylate, and trimethylolpropane trimethacrylate.

When the nonionic monofunctional ethylene unsaturated monomer and the bifunctional vinyl monomer are copolymerized and highly cross-linked, hollow resin particles having not only a light scattering property, but also properties such as heat resistance, solvent resistance, and solvent dispersibility can be obtained.

The surfactant may be any surfactant so long as the surfactant forms a molecular aggregate such as a micelle in water. Examples of the surfactant include anionic surfactant, nonionic surfactants, cationic surfactants, and amphoteric surfactants.

The polymerization initiator may be any water-soluble known compound. Examples of such compounds include hydrogen peroxide and potassium persulfate.

Examples of the aqueous dispersion medium include water and water containing a hydrophilic organic solvent.

Examples of commercially available products of the hollow resin particles include: product name ROPAQUE OP-62 (with a volume average particle diameter of 450 nm and a degree of hollowness of 33 percent), product name ROPAQUE OP-84J (with a volume average particle is diameter of 550 nm and a degree of hollowness of 20 percent), product name ROPAQUE OP-91, product name ROPAQUE HP-1055 (with a volume average particle diameter of 1,000 nm and a degree of hollowness of 55 percent), product name ROPAQUE HP-91 (with a volume average particle diameter of 1,000 nm and a degree of hollowness of 50 percent), and product name ROPAQUE ULTRA (with a volume average particle diameter of 380 nm and a degree of hollowness of 45 percent) (all available from Rohm and Haas Company) for styrene-acrylic copolymer resins; product name SX-863(A), product name SX-864(B), product name SX-866(A), product name SX-866(B) (with a volume average particle diameter of 300 nm and a degree of hollowness of 30 percent), and product name SX-868 (with a volume average particle diameter of 500 nm) (all available from JSR Corporation), and product name ROPAQUE ULTRA E (with a volume average particle diameter of 380 nm and a degree of hollowness of 45 percent) and product name ROPAQUE ULTRA DUAL (with a volume average particle diameter of 380 nm and a degree of hollowness of 45 percent) (both available from Rohm and Haas Company) for cross-linked styrene-acrylic copolymer resins; and product name NIPOL MH055 (with a volume average particle diameter of 500 nm) and product name NIPOL MH8101 (with an average particle diameter of 1 μm) (both available from Zeon Corporation) for modified styrene-acrylic copolymer resins. One of these commercially available products may be used alone or two or more of these commercially available products may be used in combination.

The proportion of the hollow resin particles is not particularly limited, may be appropriately selected depending on the intended purpose, and is preferably 5 percent by mass or greater but 12.5 percent by mass or less and more preferably 8.5 percent by mass or greater but 10 percent by mass or less of the total amount of the first ink.

When the proportion of the hollow resin particles is 5 percent by mass or greater but 12.5 percent by mass or less, the luminosity of a first ink formed with the first ink is improved.

<Organic Solvent>

Examples of the organic solvent include polyols, ethers such as polyol alkyl ethers and polyol aryl ethers, nitrogen-containing heterocyclic compounds, amides, amines, and sulfur-containing compounds.

Examples of the organic solvent include: polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethylpropnionamide, and 3-butoxy-N,N-dimethylpropionamide; amines such as monoethanolamine, diethanolamine, and triethylamine; sulfur-containing compounds such as dimethyl sulfoxide, sulfolane, and thiodiethanol; propylene carbonate; and ethylene carbonate.

Use of an organic solvent having a boiling point of 250 degrees C. or lower is preferable because such an organic solvent not only functions as a humectant but also can provide a good drying property.

Use of an organic solvent having a hydrogen bond term of 3 $(cal/cm^3)^{0.5}$ or greater but 6.8 $(cal/cm^2)^{0.5}$ or less and a boiling point of 150 degrees C. or higher but 300 degrees C. or lower is more preferable because such an organic solvent provides a good fixability.

The hydrogen bond term can be obtained by an atomic group summation method proposed by Krevelen and treating an organic molecule as an atomic group (see Krevelen, *Properties of Polymer,* 2nd Edition, New York, 154 (1976)).

Examples of organic solvents satisfying the conditions mentioned above include glycerin, 1,2-propanediol, 1,3-propanediol, 1,2-butanediol, 1,3-butanediol, isoprene glycol, and oxetane compounds.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethylene glycol monomethylether, diethyleneglycol monoethylether, diethyleneglycol monobutylether, tetraethyleneglycol monomethylether, and propylene glycol monoethylether; and polyol arylethers such as ethyleneglycol monophenylether and ethyleneglycol monobenzylether.

The polyol compounds having eight or more carbon atoms and glycolether compounds enhance the permeability of ink when paper is used as a print medium.

The proportion of the organic solvent in ink has no particular limit and can be suitably selected to suit a particular application. In terms of the drying property and discharging reliability of the ink, the proportion is preferably from 10 through 60 percent by mass and more preferably from 20 through 60 percent by mass.

<Water>

The proportion of water in the ink has no particular limit and can be suitably selected to suit to a particular application. In terms of the drying property and discharging reliability of the ink, the proportion is preferably from 10 through 90 percent by mass and more preferably from 20 through 60 percent by mass.

<Wax>

It is preferable to add a wax to the ink in order to impart lubricity to an image portion.

The wax is not particularly limited and may be appropriately selected depending on the intended purpose. Preferable examples of the wax include polyethylene-based waxes and carnauba waxes in terms of a film forming property and lubricity of the ink when applied to an image formation portion.

The polyethylene-based waxes may be commercially available products. Examples of the commercially-available products include HITEC SERIES available from Toho Chemical Industry Co., Ltd. and AQUACER SERIES available from Byk-Chemie Japan Co., Ltd.

The carnauba waxes may be commercially available products. Examples of the commercially available products include SELOSOL 524 and TRASOL CN available from Chukyo Yushi Co., Ltd.

The melting point of the wax is not particularly limited, may be appropriately selected depending on the intended purpose, and is preferably 80 degrees C. or higher but 140 degrees C. or lower and more preferably 100 degrees C. or higher but 140 degrees C. or lower. When the melting point of the wax is 80 degrees C. or higher, the wax does not excessively melt or coagulate at room temperature. This makes it possible to maintain storage stability of the ink. Meanwhile, when the melting point of the wax is 140 degrees C. or lower, the wax sufficiently melts even at room temperature. This can impart lubricity to the ink.

The volume average particle diameter of the wax is not particularly limited, may be appropriately selected depending on the intended purpose, and is preferably 0.01 µm or greater and more preferably 0.01 µm or greater but 0.1 µm or less. When the volume average particle diameter of the wax is 0.01 µm or greater, it is easy for the wax particles to be distributed toward the surface of the ink. This makes it possible to impart lubricity to the ink.

The proportion of the wax is preferably 1 percent by mass or greater but 10 percent by mass or less and more preferably 1 percent by mass or greater but 5 percent by mass or less of the total amount of the is first ink.

When the proportion of the wax is 1 percent by mass or greater but 10 percent by mass or less, an image portion has a good lubricity.

<Resin>

The type of the resin contained in the ink has no particular limit and can be suitably selected to suit to a particular application. Specific examples thereof include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins. Particles of such resins may be also used. It is possible to mix a resin emulsion in which the resin particles are dispersed in water serving as a dispersion medium with materials such as a coloring agent and an organic solvent to obtain ink. The resin particle can be synthesized or is available on the market. These can be used alone or in combination of the resin particles.

The volume average particle diameter of the resin particle is not particularly limited and can be suitably selected to suit to a particular application. The volume average particle diameter is preferably from 10 through 1,000 nm, more preferably from 10 through 200 nm, and furthermore preferably from 10 through 100 nm to obtain good fixability and image hardness.

The volume average particle diameter can be measured by using a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 through 30 percent by mass and more preferably from 5 through 20 percent by mass to the total content of the ink.

The average particle diameter of the solid content contained in the ink is not particularly limited and may be appropriately selected depending on the intended purpose. The particle diameter of particles that are the most frequent in number is preferably 20 nm or greater but 1,000 nm or less and more preferably 20 nm or greater but 800 nm or less in terms of enhancing discharging stability and image qualities such as image density. The solid content include, for example, resin particles and particles of a pigment. The average particle diameter can be measured with, for example, a particle size analyzer (NANOTRAC WAVE-UT151 available from MicrotracBEL Corp.).

<Additive>

Ink may further optionally contain a surfactant, a defoaming agent, a preservative and fungicide, a corrosion inhibitor, a pH regulator, etc.

<Surfactant>

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group as a modifying group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These fluoro surfactants are particularly preferable because these fluoro surfactants do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These surfactants can be used alone or in combination.

The silicone-based surfactants have no particular limit and can be suitably selected to suit to a particular application. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group as a modifying group is particularly preferable because such a surfactant demonstrates good characteristics as an aqueous surfactant.

Any suitably synthesized surfactant and any product thereof available on the market is suitable. Products available on the market are obtained from Byk Chemie Japan Co., Ltd., Shin-Etsu Chemical Co., Ltd., Dow Corning Toray Silicone Co., Ltd., NIHON EMULSION Co., Ltd., Kyoeisha Chemical Co., Ltd., etc.

The polyether-modified silicone-based surfactant has no particular limit and can be suitably selected to suit to a particular application. Examples thereof include a compound in which the polyalkylene oxide structure represented by the following general formula S-1 is introduced into the side chain of the Si site of dimethyl polysiloxane.

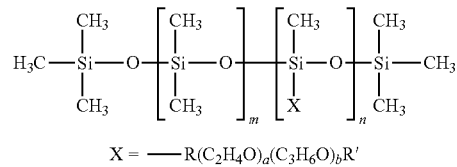

General formula S-1

$X = \text{---} R(C_2H_4O)_a(C_3H_6O)_bR'$

In the general formula S-1, "m", "n", "a", and "b" each, respectively represent integers, R represents an alkylene group, and R' represents an alkyl group.

Products available on the market may be used as the polyether-modified silicone-based surfactants. Specific examples of the products available on the market include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Silicone Co., Ltd.), BYK-33 and BYK-387 (both manufactured by Byk-Chemie Japan Co., Ltd.), and TSF4440, TSF4452, and TSF4453 (all manufactured by Toshiba Silicone Co., Ltd.).

A fluorosurfactant in which the number of carbon atoms replaced with fluorine atoms is from 2 through 16 and more preferably from 4 through 16 is preferable.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these fluorosurfactants, polyoxyalkylene ether polymer compounds having a perfluoroalkyl ether group in its side chain are preferable because these compounds do not foam easily and the fluorosurfactant represented by the following general formula F-1 or general formula F-2 is particularly preferable.

$$CF_3CF_3(CF_2CF_2)_m\text{---}CH_2CH_2O(CH_2CH_2O)_nH \quad \text{General formula F-1}$$

In general formula F-1, "m" is preferably an integer of from 0 through 10 and "n" is preferably an integer of from 0 through 40 in order to provide water solubility.

$$C_nF_{2n=1}\text{---}CH_2CH(OH)CH_2\text{---}O\text{---}(CH_2CH_2O)_a\text{---}Y \quad \text{General formula F-2}$$

In general formula F-2, Y represents H, $C_nF_{2n+1}$, where "n" is an integer of from 1 through 6, $CH_2CH(OH)CH_2\text{---}C_nF_{2n+1}$, where n represents an integer of from 4 through 6, or $C_pH_{2p+1}$, where p represents an integer of from 1 through 19. "a" represents an integer of from 4 through 14.

Products available on the market may be used as the fluorosurfactant.

Specific examples of the products available on the market include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFAC F-470, F-1405, and F-474 (all manufactured by DIC CORPORATION): ZONYL™ TBS, FSP, FSA, FSN-100, FSN, FSO-100, FSO, FS-300, and UR (all manufactured by Du Pont Kabushiki Kaisha); FT-110, FT-250, FT-251, FT-400S, FT-150, and FT-400SW (all manufactured by NEOS COMPANY LIM- ITED); POLYFOX PF-136A, PF-156A, PF-151N, PF-154, and PF-159 (manufactured by OMNOVA SOLUTIONS INC.), and UNIDYNE DSN-403N (manufactured by DAIKIN INDUSTRIES). Of these products, FS-300 (manufactured by Du Pont Kabushiki Kaisha), FT-110, FT-250, FT-251, FT-400S, FT-150, and FT-400SW (all manufactured by NEOS COMPANY LIMITED), POLYFOX PF-151N (manufactured by OMNOVA SOLUTIONS INC.), and UNIDYNE DSN-403N (manufactured by DAIKIN INDUSTRIES) are particularly preferable in terms of good printing quality, coloring in particular, and improvement on permeation, wettability, and uniform dyeing property to paper.

The proportion of the surfactant in ink is not particularly limited and can be suitably selected to suit to a particular application. It is preferably from 0.001 through 5 percent by mass and more preferably from 0.05 through 5 percent by mass in terms of excellent wettability and discharging stability and improvement on image quality.

<Defoaming Agent>

The defoaming agent has no particular limit. For example, silicon-based defoaming agents, polyether-based defoaming agents, and aliphatic acid ester-based defoaming agents are suitable. These defoaming agents can be used alone or in combination. Of these defoaming agents, silicone-based defoaming agents are preferable to easily break foams.

<Preservatives and Fungicides>

The preservatives and fungicides are not particularly limited. A specific example is 1,2-benzisothiazolin-3-on.

<Corrosion Inhibitor>

The corrosion inhibitor has no particular limit. Examples thereof are acid sulfite and sodium thiosulfate.

<pH Regulator>

The pH regulator has no particular limit. It is preferable to adjust the pH to 7 or higher. Specific examples thereof include, but are not limited to, amines such as diethanol amine and triethanol amine.

<Second Ink>

The second ink contains water and an organic solvent, preferably contains a coloring material and a wax, and further contains other components as needed.

The second ink encompasses all other inks than the white ink. Examples of the second ink include chromatic color inks containing coloring materials and clear inks free of a coloring material.

The water, the organic solvent, the wax, and the other components may be the same as the materials that can be used in the first ink.

<Coloring Material>

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo-pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4 (Phthalocyanine Blue), 16, 17:1, 56, 60, and 63; and C.I. Pigment Green 1, 4, 7, 8, 10, 17, 18, and 36.

The type of dye is not particularly limited and includes, for example, acidic dyes, direct dyes, reactive dyes, and basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in ink is preferably from 0.1 through 15 percent by mass and more preferably from 1 through 10 percent by mass in terms of enhancement of image density, fixability, and discharging stability.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, the pigment to be added to ink is not necessarily wholly coated with resin. Pigments partially or wholly uncovered with resin may be dispersed in the ink unless the pigments have an adverse impact.

To use a dispersant, for example, a known dispersant of a small molecular weight type or a high molecular weight type represented by a surfactant is used to disperse the pigments in ink.

As the dispersant, it is possible to use, for example, anionic surfactants, cationic surfactants, nonionic surfactants, amphoteric surfactants, etc. depending on the pigments.

Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

<Pigment Dispersion>

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, pigment, pigment dispersant, and other optional components and adjusting the particle diameter. It is good to use a dispersing device for dispersion.

The particle diameter of the pigment in the pigment dispersion has no particular limit. For example, the maximum frequency in the maximum number conversion is preferably from 20 through 500 nm and more preferably from 20 through 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 through 50 percent by mass and more preferably from 0.1 through 30 percent by mass.

During the production, coarse particles are optionally filtered off from the pigment dispersion with a filter, a centrifuge, etc. preferably followed by degassing.

<Properties of Ink>

Properties of the first ink and the second ink are not particularly limited and may be appropriately selected depending on the intended purpose. For example, the viscosity, surface tension, and pH are preferably in the ranges described below.

The viscosity of the inks at 25 degrees C. is preferably 5 mPa·s or greater but 30 mPa·s or less and more preferably 5 mPa·s or greater but 25 mPa·s or less because image density and character quality are improved and a good dischargeability can be obtained.

The viscosity can be measured with, for example, a rotary viscometer (available from TOKI SANGYO CO., LTD., RE-80L). The measurement conditions may be as follows:
25 degrees C.
Standard cone rotor (1°34'×R24)
Sample liquid amount: 1.2 mL
Rotation number: 50 rpm,
3 minutes.

The pH of the inks is preferably 7 or higher but 12 or lower and more preferably 8 or higher or 11 or lower in terms of prevention of corrosion of metal members to contact the inks.

(White Ink)

The white ink of the present disclosure is a white ink used together with a second ink that is to be applied on a first image to form a second image. The first image is formed with the white ink.

The white ink contains water, hollow resin particles, and an organic solvent.

The second ink contains water and an organic solvent.

An average thickness difference (A–B) between an average thickness (A) of the first image before the second ink is applied and an average thickness (B) of a white region in the first image after the second image is formed is 1 µm or greater but 3 µm or less.

The white ink of the present disclosure is identical with the first ink included in the ink set of the present disclosure.

(Ink)

The ink of the present disclosure is an ink used together with a white first ink to form a first image on which a second image is to be formed. The second image is formed with the ink.

The first ink contains water, hollow resin particles, and an organic solvent.

The ink to form the second image contains water and an organic solvent.

An average thickness difference (A–B) between an average thickness (A) of the first image before the ink to form the second image is applied and an average thickness (B) of a white region in the first image after the second image is formed is 1 µm or greater but 3 µm or less.

The ink to form the second image of the present disclosure is identical with the second ink included in the ink set of the present disclosure.

<Pre-Processing Fluid>

A pre-processing fluid contains a flocculant, an organic solvent, water, and optional materials such as a surfactant, a defoaming agent, a pH regulator, preservatives and fungicides and a corrosion inhibitor.

The organic solvent, the surfactant, the defoaming agent, the pH regulator, the preservatives and fungicides, and the corrosion inhibitor can be the same material as those for use in the ink. Also, other materials for use in known processing fluid can be used.

The type of the flocculant is not particularly limited. Examples of the flocculant include water-soluble cation polymers, acids, and polyvalent metal salts.

<Post-Processing Fluid>

A post-processing fluid has no particular limit. It is preferable that the post-processing fluid can form a transparent layer. Materials such as organic solvents, water, resins, surfactants, defoaming agents, pH regulators, preservatives and fungicides, corrosion inhibitors, etc. are suitably selected based on a necessity basis and mixed to obtain the post-processing fluid. The post-processing fluid can be applied to the entire printing area on a print medium or only the printed area.

<Print Medium>

The print medium for use in printing is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m$^2$ or less between the contact and 30 msec$^{1/2}$ after the contact according to Bristow method.

For example, plastic films of vinyl chloride resin, polyethylene terephthalate (PET), polypropylene, polyethylene, and polycarbonate are suitably used for the non-permeating substrate.

<Printing Apparatus and Printing Method>

The ink set of the present disclosure can be suitably applied to various printing apparatuses employing an inkjet printing method such as printers, facsimile machines, photocopiers, multifunction peripherals (serving as a printer, a facsimile machine, and a photocopier), and 3D model manufacturing devices.

In the present disclosure, the printing apparatus and the printing method represent an apparatus capable of discharging inks, various processing fluids, etc. to a print medium and a method printing an image on the print medium using the apparatus. The print medium means an article to which the inks or the various processing fluids can be attached at least temporarily.

The printing apparatus may further optionally include a device relating to feeding, conveying, and ejecting the print medium and other devices referred to as a pre-processing device, a post-processing device, etc. in addition to the head portion to discharge the inks.

The printing apparatus and the printing method may further optionally include a heater for use in the heating process and a drier for use in the drying process. For example, the heating device and the is drying device heat and dry the top surface and the bottom surface of a print medium having an image. The heating device and the drying device are not particularly limited. For example, a fan heater and an infra-red heater can be used. The print medium can be heated and dried before, during, and after printing.

The printing method of the present disclosure is an image forming method using an ink set including a first ink that is white and contains water, hollow resin particles, and an organic solvent, and a second ink that contains water and an organic solvent and is to be applied on a first image formed with the first ink to form a second image.

An average thickness difference (A–B) between an average thickness (A) of the first image before the second ink is applied and an average thickness (B) of a white region in the first image after the second image is formed is 1 µm or greater but 3 µm or less.

The printing apparatus of the present disclosure includes:

an image forming unit configured to discharge the first ink and the second ink included in the ink set of the present disclosure; and a heating unit configured to heat the first image formed with the first ink and the second image formed with the second ink.

The printing apparatus further includes other units as needed.

The printing method preferably further includes:

a first heating step of heating the first image after application of the first ink and before application of the second ink; and a second heating step of heating the second image after application of the second ink.

The heating temperature in the second heating step is preferably 70 degrees C. or higher but 150 degrees C. or lower and more preferably 70 degrees C. or higher but 100 degrees C. or lower. It is preferable that the heating temperature in the second heating step be equal to or higher than the heating temperature in the first heating step.

The heating time in the second heating step is preferably 5 seconds or longer but 60 seconds or shorter and more preferably 5 seconds or longer but 30 seconds or shorter. It is preferable that the heating time in the second heating step be equal to or longer than the heating time in the first heating step.

The printing apparatus and the printing method are not limited to those producing merely meaningful visible images such as texts and figures with the inks. For example, the printing apparatus and the printing method can produce patterns like geometric design and 3D images.

In addition, the printing apparatus includes both a serial type apparatus in which the discharging head is caused to move and a line type apparatus in which the discharging head is not moved, unless otherwise specified.

Furthermore, in addition to the desktop type, this printing apparatus includes a wide type capable of printing images on a large print medium such as AO, a continuous printer capable of using continuous paper wound up in a roll form as print media.

Figure 2:
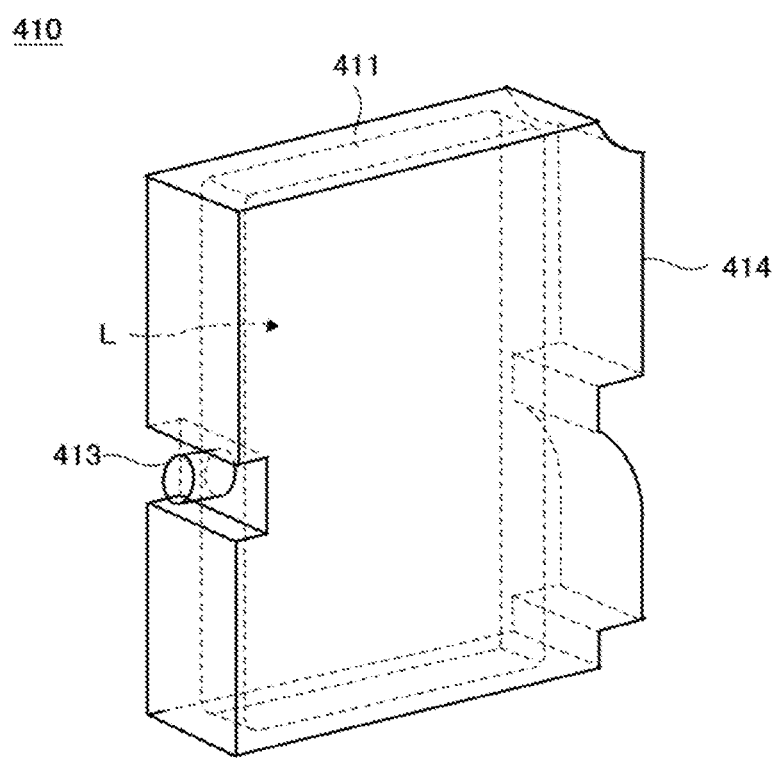
FIG. 2 is a perspective view illustrating an example of a main tank of an inkjet printing apparatus.

The printing apparatus is described using an example with reference to FIG. 1 and FIG. 2. FIG. 1 is a perspective view illustrating the apparatus. FIG. 2 is a perspective view illustrating a main tank. An image forming apparatus 400 as an example of the printing apparatus is a serial type image forming apparatus. A mechanical unit 420 is disposed in an exterior 401 of the image forming apparatus 400. Each ink accommodating unit 411 of each main tank 410 (410*k*, 410*c*, 410*m*, and 410*y*) for each color of black (K), cyan (C), magenta (M), and yellow (Y) is made of a packing member such as aluminum laminate film. The ink accommodating unit 411 is accommodated in a plastic housing unit 414. As a result, the main tank 410 is used as an ink cartridge of each color.

A cartridge holder 404 is disposed on the rear side of the opening when a cover 401*c* of the apparatus main body is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

This printing apparatus may include not only a portion discharging ink but also a device referred to as a pre-processing device, a post-processing device, etc.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

How to use the ink is not limited to the inkjet printing method. Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The applications of the ink of the present disclosure are not particularly limited and can be suitably selected to suit to a particular application. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc. The molded processed product is suitable for what is molded after surface-decorating. Examples thereof are gauges or operation panels of vehicles, office machines, electric and electronic machines, cameras, etc.

EXAMPLES

Examples of the present disclosure will be described below. However, the present disclosure should not be construed as being limited to the Examples.

Hollow Resin Particle Production Example 1

—Production of Hollow Resin Particles A—

Ion-exchanged water (726 g), methyl methacrylate (5 g), and methacrylic acid (0.1 g) were put in a four-necked separable flask equipped with a stirrer, a thermometer, a cooling device, and a dropping funnel, and heated under stirring. When the internal temperature in the separable flask became 70 degrees C., a 10 percent by mass ammonium persulfate solution (1 g) was added, and the materials were heated at 80 degrees C. for 20 minutes. Meanwhile, methyl methacrylate (141 g), methacrylic acid (94.9 g), sodium alkyl benzene sulfonate (5 g, available from DKS Co., Ltd., NEOGEN SF-20) as an anionic emulsifier, and ion-exchanged water (120 g) were emulsified with a homodisper, to make a pre-emulsion, which was then fed into the dropping funnel.

Next, with the internal temperature in the separable flask maintained at 80 degrees C., the pre-emulsion obtained above was dropped uniformly for 3 hours, while at the same time a 10 percent by mass ammonium persulfate solution (10 g) was dropped uniformly for 3 hours. After dropping was completed, the materials were aged at 80 degrees C. for 3 hours, cooled, and filtrated through a 120-mesh filter, to obtain a seed particle emulsion.

Next, ion-exchanged water (188.2 g) was put in a separable flask, and the seed particle emulsion obtained above (66 g) was added and heated to 80 degrees C. under stirring. Meanwhile, butyl acrylate (2.4 g), is butyl methacrylate (1.1 g), methyl methacrylate (19.5 g), methacrylic acid (0.7 g), sodium alkyl benzene sulfonate (0.1 g, available from DKS Co., Ltd., NEOGEN SF-20), and ion-exchanged water (55.3 g) were emulsified with a homodisper to make a pre-emulsion 1, which was then fed to a dropping funnel. With the internal temperature in the separable flask maintained at 80 degrees C., the pre-emulsion 1 obtained above was dropped uniformly for 30 minutes, while at the same time a 10 percent by mass sodium persulfate solution (1.2 g) was dropped uniformly for 30 minutes.

Next, styrene (128.3 g), sodium alkyl benzene sulfonate (0.6 g, available from DKS Co., Ltd., NEOGEN SF-20), and ion-exchanged water (51.8 g) were emulsified with a homodisper to make a pre-emulsion 2, which was then fed to a dropping funnel. One hour after dropping of the pre-emulsion 1 was completed, with the internal temperature in the separable flask maintained at 80 degrees C., the pre-emulsion 2 obtained above was dropped uniformly for 60 minutes, while at the same time a 10 percent by mass sodium persulfate solution (3.5 g) was dropped uniformly for 60 minutes. After dropping of the pre-emulsion 2 was completed, the materials were aged at 80 degrees C. for 1 hour. The resultant was cooled and filtrated through a 120-mesh filter, to obtain a styrene-acrylic copolymer resin emulsion (hollow resin particles A).

The volume average particle diameter of the obtained hollow resin particles A was 530 nm.

The volume average particle diameter was measured with a laser scattering/diffraction-type particle size measuring instrument (available from MicrotracBEL Corp., NANOTRAC WAVE EX150).

Hollow Resin Particle Production Example 2

—Production of Hollow Resin Particles B—

A methyl methacrylate resin emulsion (hollow resin particles B) was obtained in the same manner as in Hollow resin particle production example 1, except that styrene used in Hollow resin particle production example 1 was changed to methyl methacrylate.

The volume average particle diameter of the obtained hollow resin particles B measured in the same manner as in Hollow resin particle production example 1 was 530 nm.

Examples 1 to 16 and Comparative Examples 1 to 5

<Production of First Ink (White Ink)>

An organic solvent, a surfactant, a defoaming agent, a pH regulator, an antibacterial agent, and ion-exchanged water presented in Tables 1-1, 2-1, 3-1, 4-1, and 5-1 were stirred for 1 hour to be mixed uniformly.

Next, a resin and a polyethylene-based wax emulsion were added, and the materials were further stirred for 1 hour to be mixed uniformly. Subsequently, the hollow resin particles A or B were added, and the materials were further stirred for 1 hour to be mixed uniformly. This mixture was subjected to pressure filtration through a polyvinylidene fluoride membrane filter having an average pore diameter of 5 μm to remove coarse particles and litter, to obtain first inks used in Examples 1 to 16 and Comparative Examples 1 to 5.

<Production of Second Ink (Chromatic Color Ink)>

—Preparation of Water-Soluble Polymer Aqueous Solution A—

An α-olefin-maleic anhydride copolymer (available from Seiko PMC Corporation, T-YP112) (10 percent by mass), a 1 normal LiOH aqueous solution (17.34 percent by mass), and ion-exchanged water (72.56 percent by mass) were mixed and stirred under heating with a stirrer. Subsequently, a trace amount of undissolved matter was filtered out through a filter having an average pore diameter of 5 μm, to prepare a water-soluble polymer aqueous solution A.

—Cyan Pigment Surfactant Dispersion Liquid—

Polyoxyethylene styrene phenyl ether (a nonionic surfactant, available from DKS Co., Ltd., NEUGEN EA-177) (10 percent by mass) was dissolved in ion-exchanged water. To the resultant, a phthalocyanine pigment (C.I. pigment blue 15:3, available from Dainichiseika Color & Chemicals Mfg. Co., Ltd.) (30 percent by mass) was mixed and made sufficiently wet. The resultant was subjected to dispersion at 2,000 rpm for 2 hours with a wet disperser (DYNO MILL KDL A TYPE, available is from WAB AG) packed with zirconia beads having a diameter of 0.5 mm, to obtain a primary pigment dispersion.

Next, to the primary pigment dispersion, the water-soluble polymer aqueous solution A (7.51 percent by mass) and a water-soluble polyester resin (NICHIGO POLYESTER W-0030, available from Nippon Synthetic Chemical Industry Co., Ltd.) (2.51 percent by mass) were added and stirred sufficiently, to obtain a cyan pigment surfactant dispersion liquid. The average particle diameter ($D_{50}$) of the pigment in the obtained cyan pigment surfactant dispersion liquid was measured. As a result, the average particle diameter ($D_{50}$) was 78 nm. The average particle diameter ($D_{50}$) was measured with a particle size distribution measuring instrument (available from Nikkiso Co., Ltd., NANOTRAC UPA-EX150).

—Preparation of Chromatic Color Ink—

First, an organic solvent, a surfactant, a defoaming agent, a pH regulator, an antibacterial agent, an ion-exchanged water presented in the fields for Examples 1 to 15 and Comparative Examples 1 to 5 in Tables 1-1, 2-1, 3-1, 4-1, and 5-1 were stirred for 1 hour to be mixed uniformly.

To the resultant, a resin and the cyan pigment surfactant dispersion liquid were added, and the materials were further stirred for 1 hour to be mixed uniformly. This mixture was subjected to pressure filtration through a polyvinylidene fluoride membrane filter having an average pore diameter of 0.8 μm to remove coarse particles and litter, to obtain second inks used in Examples 1 to 15 and Comparative Examples 1 to 5.

The coloring material was added in the chromatic color ink at a ratio at which the solid concentration of the coloring material in the cyan pigment surfactant dispersion liquid was 5 percent by mass.

The average particle diameter of the coloring material used in the present disclosure was measured with a particle size distribution measuring instrument (available from Nikkiso Co., Ltd., NANOTRAC UPA-EX150) using a measurement sample diluted with pure water such that a solid concentration (mass concentration) in the sample would be 0.01 percent by mass. As a result, the average particle diameter was 120 nm. The average particle diameter refers to 50 percent average particle diameter ($D_{50}$).

<Production of Second Ink (Clear Ink)>

First, an organic solvent, a surfactant, a defoaming agent, a pH regulator, an antibacterial agent, and an ion-exchanged water presented in the field for Example 16 in Table 5-1 were stirred for 1 hour to be mixed uniformly.

To the resultant, a resin and a wax were added, and the materials were further stirred for 1 hour to be mixed uniformly. This mixture was subjected to pressure filtration through a polyvinylidene fluoride membrane filter having an average pore diameter of 0.8 μm to remove coarse particles and litter, to obtain a second ink (clear ink) used in Example 16.

<Image Formation>

First, each of the first inks presented in Tables 1-1, 2-1, 3-1, 4-1, and 5-1 was discharged from a liquid discharging apparatus (available from Ricoh Co., Ltd., IPSIO GXE5500) onto a print medium (available from Takeo Co., Ltd., LUMINA COLOR BLACK 127 GSM) in a manner that the first ink was attached in an amount of 1.2 mg/cm$^2$, and then heated at a heating temperature for a heating time presented in Tables 1-2, 2-2, 3-2, 4-2, and 5-2. In the case of printing the first ink a plurality of times, the printing/heating step presented in Tables 1-2, 2-2, 3-2, 4-2, and 5-2 was performed repeatedly.

Next, each of the second inks presented in Tables 1-1, 2-1, 3-1, 4-1, and 5-1 was discharged from the liquid discharging apparatus (available from Ricoh Co., Ltd., IPSIO GXE5500) onto the print medium (available from Takeo Co., Ltd., LUMINA COLOR BLACK 127 GSM) on which the first ink was printed in a manner that the second ink was attached in an amount of 0.8 mg/cm$^2$, and dried at a heating temperature for a heating time presented in Tables 1-2, 2-2, 3-2, 4-2, and 5-2.

The image chart used was a quadrangle solid image formed of a dot pattern and having a size of 3 cm on all sides. This image chart was used as an image sample.

Next, various properties were evaluated in the manners described below, using the image sample, which was the quadrangle solid image formed of a dot pattern and having a size of 3 cm on all sides. The results are presented in Tables 1-2, 2-2, 3-2, 4-2, and 5-2.

<Average Thickness of First Image and Average Thickness of White Region in First Image after Second Image was Formed>

The print sample, which was the quadrangle solid image formed of a dot pattern and having a size of 3 cm on all sides, was cut with a cutter to obtain a cross-section. The cross-section was observed with a SEM (available from JEOL Ltd., JSL-6510A) to measure the thickness at arbitrary 5 positions and calculate the average thickness.

<Contact Angle>

A contact angle meter (available from Kyowa Interface Science Co., Ltd., PCA-1) loaded with each of the second inks was used on an image sample, which was a quadrangle solid image formed of a dot pattern printed only with each of the first inks and having a size of 3 cm on all sides, to measure a contact angle of each of the second inks on the first image formed with each of the first inks.

<Dynamic Surface Tension>

The dynamic surface tension of each of the first inks and the second inks was measured with a dynamic surface tensiometer (available is from available from SITA Messtechnik GmbH, a bubble pressure tensiometer) according to a maximum foaming pressure method at 25 degrees C. for a life time of 1,500 ms. The absolute value of the difference between the dynamic surface tension of the first ink and the dynamic surface tension of the second ink was calculated.

<Luminosity (L*) of First Image Sample>

Luminosity (L*) of a first image sample, which was a quadrangle solid image formed of a dot pattern printed only with each of the first inks and having a size of 3 cm on all sides, was measured with a spectrocolorimeter (available from X-Rite Inc., X-RITE 939). A higher luminosity value means a higher degree of whiteness and a better result. A luminosity (L*) of 20 or higher is a pass level for practical use.

<Glossiness of First Image Sample>

A 60-degree glossiness, at an incident angle of 60 degrees, of a first image sample, which was a quadrangle solid image formed of a dot pattern printed only with each of the first inks and having a size of 3 cm on all sides, was measured with a gloss meter (available from Byk Gardner GmbH, MICROGLOSS 60). A higher glossiness value means that the image had a better glossiness. A 60-degree glossiness of 5 or higher is a pass level for practical use.

TABLE 1-1

|  |  | Comparative Example | | | | |
|---|---|---|---|---|---|---|
|  |  | 1 | 2 | 3 | 4 | 5 |
| First ink | Hollow resin particles A (Production example 1) | 10.0 | 10.0 | 10.0 | 10.0 | 10.0 |
|  | Hollow resin particles B (Production example 2)) | | | | | |
|  | Organic solvent A (SP value = 17.4 $[cal/cm^3]^{0.5}$) | 3.0 | 3.0 | 3.0 | 3.0 | 3.0 |
|  | Organic solvent B (SP value = 14.3 $[cal/cm^3]^{0.5}$) | 20.0 | 10.0 | 20.0 | 20.0 | 20.0 |
|  | Organic solvent C (SP value = 13.1 $[cal/cm^3]^{0.5}$) | 10.0 | 12.5 | 10.0 | 10.0 | 10.0 |
|  | Organic solvent D (SP value = 11.0 $[cal/cm^3]^{0.5}$) | | | | | |
|  | Organic solvent E (SP value = 9.2 $[cal/cm^3]^{0.5}$) | | 15.0 | | | |
|  | Surfactant | 1.0 | 1.0 | 1.0 | 1.0 | 1.0 |
|  | Defoaming agent | 1.5 | 1.5 | 1.5 | 1.5 | 1.5 |
|  | Resin | 2.0 | 2.0 | 2.0 | 2.0 | 2.0 |
|  | Polyethylene-based wax emulsion | 1.0 | 1.0 | 1.0 | 1.0 | 1.0 |
|  | Antibacterial agent | 0.1 | 0.1 | 0.1 | 0.1 | 0.1 |
|  | pH regulator | 0.2 | 0.2 | 0.2 | 0.2 | 0.2 |
|  | Ion-exchanged water (SP value = 23.3 $[cal/cm^3]^{0.5}$) | 51.2 | 43.7 | 51.2 | 51.2 | 51.2 |
|  | Total (percent by mass) | 100.0 | 100.0 | 100.0 | 100.0 | 100.0 |
| Second ink | Cyan pigment surfactant dispersion liquid | 5.0 | 5.0 | 5.0 | 5.0 | 5.0 |
|  | Organic solvent A (SP value = 17.4 $[cal/cm^3]^{0.5}$) | 10.0 | 10.0 | 3.0 | | 3.0 |
|  | Organic solvent B (SP value = 14.3 $[cal/cm^3]^{0.5}$) | 25.0 | 25.0 | 30.0 | | 30.0 |
|  | Organic solvent D (SP value = 11.0 $[cal/cm^3]^{0.5}$) | | | 5.0 | 15.0 | 5.0 |
|  | Organic solvent E (SP value = 9.2 $[cal/cm^3]^{0.5}$) | | | | 28.0 | |
|  | Surfactant | 1.0 | 1.0 | 0.1 | 1.0 | 1.0 |
|  | Defoaming agent | 1.5 | 1.5 | 0.2 | 1.5 | 1.5 |
|  | Resin | 5.0 | 5.0 | 5.0 | 5.0 | 5.0 |
|  | Polyethylene-based wax emulsion | | | | | |
|  | Antibacterial agent | 0.1 | 0.1 | 0.1 | 0.1 | 0.1 |
|  | pH regulator | 0.2 | 0.2 | 0.2 | 0.2 | 0.2 |
|  | Ion-exchanged water (SP value = 23.3 $[cal/cm^3]^{0.5}$) | 52.2 | 52.2 | 51.5 | 44.2 | 49.2 |
|  | Total (percent by mass) | 100.0 | 100.0 | 100.0 | 100.0 | 100.0 |

TABLE 1-2

|  |  |  | Comparative Example | | | | |
|---|---|---|---|---|---|---|---|
|  |  |  | 1 | 2 | 3 | 4 | 5 |
| Heating condition | Heating temperature | Heating temperature [° C.] after application of first ink | 90 | 90 | 90 | 90 | 180 |
|  |  | Heating temperature [° C.] after application of second ink | 90 | 90 | 90 | 90 | 180 |
|  | Heating time | Heating time [s] after application of first ink | 30 | 30 | 30 | 30 | 5 |
|  |  | Heating time [s] after application of second ink | 30 | 30 | 30 | 30 | 5 |
|  | Number of printing operations | Number of times first ink was printed | 2 | 2 | 2 | 2 | 2 |
| Evaluation items | Average thickness | Average thickness (A) [μm] of first image | 10 | 0 | 10 | 10 | 10 |
|  |  | Average thickness (B) [μm] of white region in first image after second image was formed | 10 | 0 | 10 | 2 | 6 |
|  |  | Average thickness difference (A − B) [μm] | 0 | 0 | 0 | 8 | 4 |
|  | Contact angle | Contact angle [°] of second ink on first image | 28.6 | 28.6 | 33.1 | 24.1 | 24.0 |
|  | SP value | Mixed SP value (X) $[cal/cm^3]^{0.5}$ of water and organic solvent in first ink | 19.74 | 17.99 | 19.74 | 19.74 | 19.74 |
|  |  | Mixed SP value (Y) $[cal/cm^3]^{0.5}$ of water and organic solvent in second ink | 20.04 | 20.04 | 19.40 | 16.66 | 19.30 |
|  |  | SP value difference (X − Y) $[cal/cm^3]^{0.5}$ | −0.3 | −2.0 | 0.3 | 3.1 | 0.4 |
|  |  | SP value $[cal/cm^3]^{0.5}$ of organic solvent of which proportion in first ink was highest | 14.3 | 9.2 | 14.3 | 14.3 | 14.3 |
|  |  | SP value $[cal/cm^3]^{0.5}$ of organic solvent of which proportion in second ink was highest | 14.3 | 14.3 | 14.3 | 9.2 | 14.3 |
|  |  | SP value difference $[cal/cm^3]^{0.5}$ | 0.0 | −5.1 | 0.0 | 5.1 | 0.0 |
|  | Dynamic surface tension | Dynamic surface tension [mN/m] of first ink | 20.9 | 20.1 | 20.9 | 20.9 | 20.9 |
|  |  | Dynamic surface tension [mN/m] of second ink | 32.4 | 32.4 | 35.6 | 30.1 | 32.4 |

TABLE 1-2-continued

|  |  | Comparative Example | | | | |
|---|---|---|---|---|---|---|
|  |  | 1 | 2 | 3 | 4 | 5 |
|  | Absolute value difference [mN/m] between surface tensions | 11.5 | 12.3 | 14.7 | 9.2 | 11.5 |
| Luminosity | Luminosity (L*) of first image | 83.0 | 5.0 | 83.1 | 8.0 | 13.0 |
| Glossiness | 60-degree glossiness of first image | 3 | 21 | 2 | 13 | 25 |

TABLE 2-1

|  |  | Example | | | | |
|---|---|---|---|---|---|---|
|  |  | 1 | 2 | 3 | 4 | 5 |
| First ink | Hollow resin particles A (Production example 1) | 10.0 | 10.0 | 10.0 | 8.5 | 10.0 |
|  | Hollow resin particles B (Production example 2)) |  |  |  |  |  |
|  | Organic solvent A (SP value = 17.4 $[cal/cm^3]^{0.5}$) | 3.0 | 3.0 | 3.0 | 3.0 | 3.0 |
|  | Organic solvent B (SP value = 14.3 $[cal/cm^3]^{0.5}$) | 20.0 | 20.0 | 20.0 | 20.0 | 20.0 |
|  | Organic solvent C (SP value = 13.1 $[cal/cm^3]^{0.5}$) | 10.0 | 10.0 | 10.0 | 10.0 | 10.0 |
|  | Organic solvent D (SP value = 11.0 $[cal/cm^3]^{0.5}$) |  |  |  |  |  |
|  | Organic solvent E (SP value = 9.2 $[cal/cm^3]^{0.5}$) |  |  |  |  |  |
|  | Surfactant | 1.0 | 1.0 | 1.0 | 1.0 | 1.0 |
|  | Defoaming agent | 1.5 | 1.5 | 1.5 | 1.5 | 1.5 |
|  | Resin | 2.0 | 2.0 | 2.0 | 2.0 | 2.0 |
|  | Polyethylene-based wax emulsion | 1.0 | 1.0 | 1.0 | 1.0 | 1.0 |
|  | Antibacterial agent | 0.1 | 0.1 | 0.1 | 0.1 | 0.1 |
|  | pH regulator | 0.2 | 0.2 | 0.2 | 0.2 | 0.2 |
|  | Ion-exchanged water (SP value = 23.3 $[cal/cm^3]^{0.5}$) | 51.2 | 51.2 | 51.2 | 52.7 | 51.2 |
|  | Total (percent by mass) | 100.0 | 100.0 | 100.0 | 100.0 | 100.0 |
| Second ink | Cyan pigment surfactant dispersion liquid | 5.0 | 5.0 | 5.0 | 5.0 | 5.0 |
|  | Organic solvent A (SP value = 17.4 $[cal/cm^3]^{0.5}$) | 5.0 | 3.0 |  | 5.0 | 5.0 |
|  | Organic solvent B (SP value = 14.3 $[cal/cm^3]^{0.5}$) | 31.0 | 30.0 | 32.0 | 31.0 | 31.0 |
|  | Organic solvent D (SP value = 11.0 $[cal/cm^3]^{0.5}$) |  | 5.0 | 8.0 |  |  |
|  | Organic solvent E (SP value = 9.2 $[cal/cm^3]^{0.5}$) |  |  |  |  |  |
|  | Surfactant | 1.0 | 1.0 | 1.0 | 1.0 | 1.0 |
|  | Defoaming agent | 1.5 | 1.5 | 1.5 | 1.5 | 1.5 |
|  | Resin | 5.0 | 5.0 | 5.0 | 5.0 | 5.0 |
|  | Polyethylene-based wax emulsion |  |  |  |  |  |
|  | Antibacterial agent | 0.1 | 0.1 | 0.1 | 0.1 | 0.1 |
|  | pH regulator | 0.2 | 0.2 | 0.2 | 0.2 | 0.2 |
|  | Ion-exchanged water (SP value = 23.3 $[cal/cm^3]^{0.5}$) | 51.2 | 49.2 | 47.2 | 51.2 | 51.2 |
|  | Total (percent by mass) | 100.0 | 100.0 | 100.0 | 100.0 | 100.0 |

TABLE 2-2

|  |  |  | Example | | | | |
|---|---|---|---|---|---|---|---|
|  |  |  | 1 | 2 | 3 | 4 | 5 |
| Heating condition | Heating temperature | Heating temperature [° C.] after application of first ink | 90 | 90 | 90 | 90 | 90 |
|  |  | Heating temperature [° C.] after application of second ink | 90 | 90 | 90 | 90 | 90 |
|  | Heating time | Heating time [s] after application of first ink | 30 | 30 | 30 | 30 | 30 |
|  |  | Heating time [s] after application of second ink | 30 | 30 | 30 | 30 | 30 |
|  | Number of printing operations | Number of times first ink was printed | 2 | 2 | 2 | 1 | 1 |
| Evaluation items | Average thickness | Average thickness (A) [μm] of first image | 10 | 10 | 10 | 3 | 5 |
|  |  | Average thickness (B) [μm] of white region in first image after second image was formed | 9 | 8 | 7 | 2 | 4 |
|  |  | Average thickness difference (A − B) [μm] | 1 | 2 | 3 | 1 | 1 |
|  | Contact angle | Contact angle [°] of second ink on first image | 27.2 | 26.0 | 24.5 | 27.2 | 27.2 |

TABLE 2-2-continued

|  |  | Example |  |  |  |  |
|---|---|---|---|---|---|---|
|  |  | 1 | 2 | 3 | 4 | 5 |
| SP value | Mixed SP value (X) $[cal/cm^3]^{0.5}$ of water and organic solvent in first ink | 19.74 | 19.74 | 19.74 | 19.80 | 19.74 |
|  | Mixed SP value (Y) $[cal/cm^3]^{0.5}$ of water and organic solvent in second ink | 19.76 | 19.30 | 18.87 | 19.76 | 19.76 |
|  | SP value difference (X − Y) $[cal/cm^3]^{0.5}$ | 0.0 | 0.4 | 0.9 | 0.0 | 0.0 |
|  | SP value $[cal/cm^3]^{0.5}$ of organic solvent of which proportion in first ink was highest | 14.3 | 14.3 | 14.3 | 14.3 | 14.3 |
|  | SP value $[cal/cm^3]^{0.5}$ of organic solvent of which proportion in second ink was highest | 14.3 | 14.3 | 14.3 | 14.3 | 14.3 |
|  | SP value difference $[cal/cm^3]^{0.5}$ | 0.0 | 0.0 | 0.0 | 0.0 | 0.0 |
| Dynamic surface tension | Dynamic surface tension [mN/m] of first ink | 20.9 | 20.9 | 20.9 | 20.9 | 20.9 |
|  | Dynamic surface tension [mN/m] of second ink | 32.4 | 32.4 | 32.4 | 32.4 | 32.4 |
|  | Absolute value difference [mN/m] between surface tensions | 11.5 | 11.5 | 11.5 | 11.5 | 11.5 |
| Luminosity | Luminosity (L*) of printed portion of first image | 82.5 | 82.1 | 78.0 | 25.2 | 52.4 |
| Glossiness | 60-degree glossiness of first image | 10 | 15 | 18 | 10 | 10 |

TABLE 3-1

|  |  | Example |  |  |  |  |
|---|---|---|---|---|---|---|
|  |  | 6 | 7 | 8 | 9 | 10 |
| First ink | Hollow resin particles A (Production example 1) | 10.0 | 10.0 | 10.0 | 10.0 | 10.0 |
|  | Hollow resin particles B (Production example 2) |  |  |  |  |  |
|  | Organic solvent A (SP value = 17.4 $[cal/cm^3]^{0.5}$) | 3.0 | 3.0 | 3.0 | 3.0 | 3.0 |
|  | Organic solvent B (SP value = 14.3 $[cal/cm^3]^{0.5}$) | 20.0 | 20.0 | 20.0 | 20.0 | 20.0 |
|  | Organic solvent C (SP value = 13.1 $[cal/cm^3]^{0.5}$) | 10.0 | 10.0 | 10.0 | 10.0 | 10.0 |
|  | Organic solvent D (SP value = 11.0 $[cal/cm^3]^{0.5}$) |  |  |  |  |  |
|  | Organic solvent E (SP value = 9.2 $[cal/cm^3]^{0.5}$) |  |  |  |  |  |
|  | Surfactant | 1.0 | 1.0 | 1.0 | 1.0 | 1.0 |
|  | Defoaming agent | 1.5 | 1.5 | 1.5 | 1.5 | 1.5 |
|  | Resin | 2.0 | 2.0 | 2.0 | 2.0 | 2.0 |
|  | Polyethylene-based wax emulsion | 1.0 | 1.0 | 1.0 | 1.0 | 1.0 |
|  | Antibacterial agent | 0.1 | 0.1 | 0.1 | 0.1 | 0.1 |
|  | pH regulator | 0.2 | 0.2 | 0.2 | 0.2 | 0.2 |
|  | Ion-exchanged water (SP value = 23.3 $[cal/cm^3]^{0.5}$) | 51.2 | 51.2 | 51.2 | 51.2 | 51.2 |
|  | Total (percent by mass) | 100.0 | 100.0 | 100.0 | 100.0 | 100.0 |
| Second ink | Cyan pigment surfactant dispersion liquid | 5.0 | 5.0 | 5.0 | 5.0 | 5.0 |
|  | Organic solvent A (SP value = 17.4 $[cal/cm^3]^{0.5}$) | 5.0 | 5.0 | 3.0 | 3.0 | 3.0 |
|  | Organic solvent B (SP value = 14.3 $[cal/cm^3]^{0.5}$) | 31.0 | 31.0 | 30.0 | 30.0 | 30.0 |
|  | Organic solvent D (SP value = 11.0 $[cal/cm^3]^{0.5}$) |  |  |  | 5.0 | 5.0 |
|  | Organic solvent E (SP value = 9.2 $[cal/cm^3]^{0.5}$) |  |  | 5.0 | 5.0 | 5.0 |
|  | Surfactant | 1.0 | 1.0 | 3.0 | 0.5 | 0.4 |
|  | Defoaming agent | 1.5 | 1.5 | 4.5 | 0.8 | 0.6 |
|  | Resin | 5.0 | 5.0 | 5.0 | 5.0 | 5.0 |
|  | Polyethylene-based wax emulsion |  |  |  |  |  |
|  | Antibacterial agent | 0.1 | 0.1 | 0.1 | 0.1 | 0.1 |
|  | pH regulator | 0.2 | 0.2 | 0.9 | 0.2 | 0.2 |
|  | Ion-exchanged water (SP value = 23.3 $[cal/cm^3]^{0.5}$) | 51.2 | 51.2 | 44.2 | 50.5 | 50.7 |
|  | Total (percent by mass) | 100.0 | 100.0 | 100.0 | 100.0 | 100.0 |

TABLE 3-2

|  |  |  | Example |  |  |  |  |
|---|---|---|---|---|---|---|---|
|  |  |  | 6 | 7 | 8 | 9 | 10 |
| Heating condition | Heating temperature | Heating temperature [° C.] after application of first ink | 90 | 90 | 90 | 90 | 90 |

TABLE 3-2-continued

|  |  |  | Example | | | | |
|---|---|---|---|---|---|---|---|
|  |  |  | 6 | 7 | 8 | 9 | 10 |
| Evaluation items | Heating time | Heating temperature [° C.] after application of second ink | 90 | 90 | 90 | 90 | 90 |
|  |  | Heating time [s] after application of first ink | 30 | 30 | 30 | 30 | 30 |
|  |  | Heating time [s] after application of second ink | 30 | 30 | 30 | 30 | 30 |
|  | Number of printing operations | Number of times first ink was printed | 9 | 12 | 2 | 2 | 2 |
|  | Average thickness | Average thickness (A) [μm] of first image | 50 | 60 | 10 | 10 | 10 |
|  |  | Average thickness (B) [μm] of white region in first image after second image was formed | 49 | 59 | 7 | 9 | 9 |
|  |  | Average thickness difference (A − B) [μm] | 1 | 1 | 3 | 1 | 1 |
|  | Contact angle | Contact angle [°] of second ink on first image | 27.2 | 27.2 | 14.3 | 29.8 | 31.2 |
|  | SP value | Mixed SP value (X) [cal/cm³]^0.5 of water and organic solvent in first ink | 19.74 | 19.74 | 19.74 | 19.74 | 19.74 |
|  |  | Mixed SP value (Y) [cal/cm³]^0.5 of water and organic solvent in second ink | 19.76 | 19.76 | 19.05 | 19.35 | 19.36 |
|  |  | SP value difference (X − Y) [cal/cm³]^0.5 | 0.0 | 0.0 | 0.7 | 0.4 | 0.4 |
|  |  | SP value [cal/cm³]^0.5 of organic solvent of which proportion in first ink was highest | 14.3 | 14.3 | 14.3 | 14.3 | 14.3 |
|  |  | SP value [cal/cm³]^0.5 of organic solvent of which proportion in second ink was highest | 14.3 | 14.3 | 14.3 | 14.3 | 14.3 |
|  |  | SP value difference [cal/cm³]^0.5 | 0.0 | 0.0 | 0.0 | 0.0 | 0.0 |
|  | Dynamic surface tension | Dynamic surface tension [mN/m] of first ink | 20.9 | 20.9 | 20.9 | 20.9 | 20.9 |
|  |  | Dynamic surface tension [mN/m] of second ink | 32.4 | 32.4 | 20.1 | 32.8 | 33.5 |
|  |  | Absolute value difference [mN/m] between surface tensions | 11.5 | 11.5 | 0.8 | 11.9 | 12.6 |
|  | Luminosity | Luminosity (L*) of first image | 85.3 | 85.5 | 78.4 | 83.0 | 83.0 |
|  | Glossiness | 60-degree glossiness of first image | 10 | 10 | 20 | 8 | 5 |

TABLE 4-1

|  |  | Example | | | |
|---|---|---|---|---|---|
|  |  | 11 | 12 | 13 | 14 |
| First ink | Hollow resin particles A (Production example 1) | 10.0 | 10.0 | 10.0 | 10.0 |
|  | Hollow resin particles B (Production example 2)) |  |  |  |  |
|  | Organic solvent A (SP value = 17.4 [cal/cm³]^0.5) | 3.0 | 3.0 | 3.0 | 8.0 |
|  | Organic solvent B (SP value = 14.3 [cal/cm³]^0.5) | 20.0 | 10.0 | 10.0 | 12.0 |
|  | Organic solvent C (SP value = 13.1 [cal/cm³]^0.5) | 10.0 | 10.0 | 10.0 | 10.0 |
|  | Organic solvent D (SP value = 11.0 [cal/cm³]^0.5) |  | 15.0 |  |  |
|  | Organic solvent E (SP value = 9.2 [cal/cm³]^0.5) |  |  | 15.0 |  |
|  | Surfactant | 1.0 | 1.0 | 1.0 | 1.0 |
|  | Defoaming agent | 1.5 | 1.5 | 1.5 | 1.5 |
|  | Resin | 2.0 | 2.0 | 2.0 | 2.0 |
|  | Polyethylene-based wax emulsion | 1.0 | 1.0 | 1.0 | 1.0 |
|  | Antibacterial agent | 0.1 | 0.1 | 0.1 | 0.1 |
|  | pH regulator | 0.2 | 0.2 | 0.2 | 0.2 |
|  | Ion-exchanged water (SP value = 23.3 [cal/cm³]^0.5) | 51.2 | 46.2 | 46.2 | 54.2 |
|  | Total (percent by mass) | 100.0 | 100.0 | 100.0 | 100.0 |
| Second ink | Cyan pigment surfactant dispersion liquid | 5.0 | 5.0 | 5.0 | 5.0 |
|  | Organic solvent A (SP value = 17.4 [cal/cm³]^0.5) |  | 3.0 | 3.0 | 5.0 |
|  | Organic solvent B (SP value = 14.3 [cal/cm³]^0.5) |  | 30.0 | 30.0 | 31.0 |
|  | Organic solvent D (SP value = 11.0 [cal/cm³]^0.5) | 25.0 | 5.0 | 5.0 |  |
|  | Organic solvent E (SP value = 9.2 [cal/cm³]^0.5) | 17.0 |  |  |  |
|  | Surfactant | 1.0 | 1.0 | 1.0 | 1.0 |
|  | Defoaming agent | 1.5 | 1.5 | 1.5 | 1.5 |
|  | Resin | 5.0 | 5.0 | 5.0 | 5.0 |
|  | Polyethylene-based wax emulsion |  |  |  |  |
|  | Antibacterial agent | 0.1 | 0.1 | 0.1 | 0.1 |
|  | pH regulator | 0.2 | 0.2 | 0.2 | 0.2 |
|  | Ion-exchanged water (SP value = 23.3 [cal/cm³]^0.5) | 45.2 | 49.2 | 49.2 | 51.2 |
|  | Total (percent by mass) | 100.0 | 100.0 | 100.0 | 100.0 |

TABLE 4-2

|  |  |  | Example 11 | Example 12 | Example 13 | Example 14 |
|---|---|---|---|---|---|---|
| Heating condition | Heating temperature | Heating temperature [° C.] after application of first ink | 90 | 90 | 90 | 90 |
|  |  | Heating temperature [° C.] after application of second ink | 90 | 90 | 90 | 90 |
|  | Heating time | Heating time [s] after application of first ink | 30 | 30 | 30 | 30 |
|  |  | Heating time [s] after application of second ink | 30 | 30 | 30 | 30 |
|  | Number of printing operations | Number of times first ink was printed | 2 | 2 | 2 | 2 |
| Evaluation items | Average thickness | Average thickness (A) [μm] of first image | 10 | 10 | 10 | 10 |
|  |  | Average thickness (B) [μm] of white region in first image after second image was formed | 7 | 8 | 8 | 9 |
|  |  | Average thickness difference (A − B) [μm] | 3 | 2 | 2 | 1 |
|  | Contact angle | Contact angle [°] of second ink on first image | 24.0 | 27.1 | 27.9 | 27.2 |
|  | SP value | Mixed SP value (X) [cal/cm$^3$]$^{0.5}$ of water and organic solvent in first ink | 19.74 | 18.62 | 18.30 | 20.25 |
|  |  | Mixed SP value (Y) [cal/cm$^3$]$^{0.5}$ of water and organic solvent in second ink | 17.02 | 19.30 | 19.30 | 19.76 |
|  |  | SP value difference (X − Y) [cal/cm$^3$]$^{0.5}$ | 2.7 | −0.7 | −1.0 | 0.5 |
|  |  | SP value [cal/cm$^3$]$^{0.5}$ of organic solvent of which proportion in first ink was highest | 14.3 | 11.0 | 9.2 | 14.3 |
|  |  | SP value [cal/cm$^3$]$^{0.5}$ of organic solvent of which proportion in second ink was highest | 11.0 | 14.3 | 14.3 | 14.3 |
|  |  | SP value difference [cal/cm$^3$]$^{0.5}$ | 3.3 | −3.3 | −5.1 | 0.0 |
|  | Dynamic surface tension | Dynamic surface tension [mN/m] of first ink | 20.9 | 20.5 | 20.2 | 21.3 |
|  |  | Dynamic surface tension [mN/m] of second ink | 31.4 | 32.4 | 32.4 | 32.4 |
|  |  | Absolute value difference [mN/m] between surface tensions | 10.5 | 11.9 | 12.2 | 11.1 |
|  | Luminosity | Luminosity (*) of first image | 74.1 | 79.5 | 25.1 | 83.1 |
|  | Glossiness | 60-degree glossiness of first image | 18 | 15 | 14 | 8 |

TABLE 5-1

|  |  | Example 15 | Example 16 |
|---|---|---|---|
| First ink | Hollow resin particles A (Production example 1) |  | 10.0 |
|  | Hollow resin particles B (Production example 2) | 10.0 |  |
|  | Organic solvent A (SP value = 17.4 [cal/cm$^3$]$^{0.5}$) | 3.0 | 2.0 |
|  | Organic solvent B (SP value = 14.3 [cal/cm$^3$]$^{0.5}$) | 20.0 | 20.0 |
|  | Organic solvent C (SP value = 13.1 [cal/cm$^3$]$^{0.5}$) | 10.0 | 10.0 |
|  | Organic solvent D (SP value = 11.0 [cal/cm$^3$]$^{0.5}$) |  |  |
|  | Organic solvent E (SP value = 9.2 [cal/cm$^3$]$^{0.5}$) |  |  |
|  | Surfactant | 1.0 | 1.0 |
|  | Defoaming agent | 1.5 | 1.5 |
|  | Resin | 2.0 | 2.0 |
|  | Polyethylene-based wax emulsion | 1.0 | 1.0 |
|  | Antibacterial agent | 0.1 | 0.1 |
|  | pH regulator | 0.2 | 0.2 |
|  | Ion-exchanged water (SP value = 23.3 [cal/cm$^3$]$^{0.5}$) | 51.2 | 51.2 |
|  | Total (percent by mass) | 100.0 | 100.0 |
| Second ink | Cyan pigment surfactant dispersion liquid | 5.0 |  |
|  | Organic solvent A (SP value = 17.4 [cal/cm$^3$]$^{0.5}$) | 3.0 | 5.0 |
|  | Organic solvent B (SP value = 14.3 [cal/cm$^3$]$^{0.5}$) | 30.0 | 30.0 |
|  | Organic solvent D (SP value = 11.0 [cal/cm$^3$]$^{0.5}$) | 5.0 |  |
|  | Organic solvent E (SP value = 9.2 [cal/cm$^3$]$^{0.5}$) |  |  |
|  | Surfactant | 1.0 | 1.0 |
|  | Defoaming agent | 1.5 | 1.5 |
|  | Resin | 5.0 | 15.0 |
|  | Polyethylene-based wax emulsion |  | 1.0 |
|  | Antibacterial agent | 0.1 | 0.1 |
|  | pH regulator | 0.2 | 0.2 |
|  | Ion-exchanged water (SP value = 23.3 [cal/cm$^3$]$^{0.5}$) | 49.2 | 46.2 |
|  | Total (percent by mass) | 100.0 | 100.0 |

TABLE 5-2

| | | | Example | |
|---|---|---|---|---|
| | | | 15 | 16 |
| Heating condition | Heating temperature | Heating temperature [° C.] after application of first ink | 90 | 90 |
| | | Heating temperature [° C.] after application of second ink | 90 | 90 |
| | Heating time | Heating time [s] after application of first ink | 30 | 30 |
| | | Heating time [s] after application of second ink | 30 | 30 |
| | Number of printing operations | Number of times first ink was printed | 2 | 2 |
| Evaluation items | Average thickness | Average thickness (A) [μm] of first image | 10 | 10 |
| | | Average thickness (B) [μm] of white region in first image after second image was formed | 9 | 8 |
| | | Average thickness difference (A − B) [μm] | 1 | 2 |
| | Contact angle | Contact angle [°] of second ink on first image | 26.5 | 28.1 |
| | SP value | Mixed SP value (X) [cal/cm$^3$]$^{0.5}$ of water and organic solvent in first ink | 19.74 | 19.74 |
| | | Mixed SP value (Y) [cal/cm$^3$]$^{0.5}$ of water and organic solvent in second ink | 19.30 | 19.61 |
| | | SP value difference (X − Y) [cal/cm$^3$]$^{0.5}$ | 0.4 | 0.1 |
| | | SP value [cal/cm$^3$]$^{0.5}$ of organic solvent of which proportion in first ink was highest | 14.3 | 14.3 |
| | | SP value [cal/cm$^3$]$^{0.5}$ of organic solvent of which proportion in second ink was highest | 14.3 | 14.3 |
| | | SP value difference [cal/cm$^3$]$^{0.5}$ | 0.0 | 0.0 |
| | Dynamic surface tension | Dynamic surface tension [mN/m] of first ink | 21.2 | 20.9 |
| | | Dynamic surface tension [mN/m] of second ink | 32.4 | 30.1 |
| | | Absolute value difference [mN/m] between surface tensions | 11.2 | 9.2 |
| | Luminosity | Luminosity (L*) of first image | 79.9 | 81.1 |
| | Glossiness | 60-degree glossiness of first image | 13 | 14 |

Details of the compositions of the first inks and the second inks in Tables 1-1, 2-1, 3-1, 4-1, and 5-1 are as follows.

<Organic Solvent>

Organic solvent A: Glycerin, SP value=17.4 (cal/cm$^3$)$^{0.5}$

Organic solvent B: 1,2-Propanediol, SP value=14.3 (cal/cm$^3$)$^{0.5}$

Organic solvent C: 1,2-Butanediol, SP value=13.1 (cal/cm$^3$)$^{0.5}$

Organic solvent D: 3-Ethyl-3-hydroxymethyloxetane, SP value=11.0 (cal/cm$^3$)$^{0.5}$ Organic solvent E: 3-Methoxy-N,N-dimethylpropoxyamide, SP value=9.2 (cal/cm$^3$)$^{0.5}$ <Surfactant>

Silicone-based surfactant (available from Shin-Etsu Chemical Co., Ltd., KF-G011)

<Defoaming Agent>

Available from Shin-Etsu Chemical Co., Ltd., KF-615A

<Resin>

Acrylic-silicone resin (available from Toyo Chem Co., Ltd., RKP-02, with a solid concentration of 40 percent by mass)

<Wax>

Polyethylene-based wax emulsion: available from Byk-Chemie Japan Co., Ltd., product name: AQUACER-515, with a solid concentration of 35 percent by mass <Antibacterial Agent>

PROXEL LV(S) (available from Avecia Inc.)

<pH Regulator>

2-Amino-2-ethyl-1,3-propanediol (available from Tokyo Chemical Industry Co., Ltd.)

<Water>

Ion-exchanged water (SP value=23.3 (cal/cm$^3$)$^{0.5}$)

Text Examples 1 to 6

—Evaluation of Influence of Heating Temperature and Heating Time in First Heating Step and Second Heating Step—

Using the same first ink and second ink as used in Example 1, average thickness difference (A–B), luminosity (L*), and glossiness were evaluated in the same manners as in Example 1 except that the heating temperatures and the heating times in the first heating step and the second heating step were changed as presented in Table 6. The results are presented in Table 6. Test example 1 is identical with Example 1 and Test example 5 is identical with Comparative

TABLE 6

| | | Heating temperature (° C.) in first heating step | Heating time (s) in first heating step | Heating temperature (° C.) in second heating step | Heating time (s) in second heating step | Average thickness difference (A − B) (μm) | Evaluation result | |
|---|---|---|---|---|---|---|---|---|
| | | | | | | | Luminosity | Glossiness |
| Test example | 1 | 90 | 30 | 90 | 30 | 1 | 82.5 | 10 |
| | 2 | 50 | 120 | 50 | 120 | 2 | 84.1 | 2 |
| | 3 | 70 | 60 | 70 | 60 | 2 | 84.1 | 8 |
| | 4 | 150 | 10 | 150 | 10 | 3 | 84.1 | 15 |
| | 5 | 180 | 5 | 180 | 5 | 4 | 13.0 | 25 |
| | 6 | 90 | 30 | 70 | 10 | 1 | 82.5 | 5 |

From the results of Table 6, in Test examples 1, 3, and 4, the heating temperatures and the heating times in the first heating step and the second heating step were adequate, and luminosity and glossiness were good. Example 5. Test example 1 and Test example 5 are presented for comparison.

In Test example 2, the heating temperatures in the first heating step and the second heating step were excessively low and the heating times in the first heating step and the second heating step were long. As a result, glossiness was poor.

In Test example 5, the heating temperatures in the first heating step and the second heating step were excessively high. As a result, luminosity was poor.

In Test example 6, the heating temperature in the second heating step was lower than the heating temperature in the first heating step, and the heating time in the second heating step was shorter than the heating time in the first heating step. As a result, glossiness was poor.

Aspects of the present disclosure are as follows, for example.

<1> An ink set including:
a first ink that is white and contains water, hollow resin particles, and at least one organic solvent; and
a second ink that contains water and at least one organic solvent and is to be applied on a first image formed with the first ink to form a second image,
wherein an average thickness difference (A–B) between an average thickness (A) of the first image before the second ink is applied and an average thickness (B) of a white region in the first image after the second image is formed is 1 μm or greater but 3 μm or less.

<2> The ink set according to <1>,
wherein the average thickness (A) of the first image is 5 μm or greater but 50 μm or less.

<3> The ink set according to <1> or <2>,
wherein a contact angle of the second ink on the first image is 15 degrees or greater but 30 degrees or less.

<4> The ink set according to any one of <1> to <3>,
wherein a solubility parameter (X) of a mixture solution of the at least one organic solvent and water contained in the first ink and a solubility parameter (Y) of a mixture solution of the at least one organic solvent and water contained in the second ink are 17.0 $(cal/cm^3)^{0.5}$ or greater but 20.2 $(cal/cm^3)^{0.5}$ or less.

<5> The ink set according to <4>,
wherein a solubility parameter difference (X–Y) between the solubility parameter (X) and the solubility parameter (Y) is −1 or greater but 3 or less.

<6> The ink set according to any one of <1> to <5>,
wherein a solubility parameter difference (C–D) is −3 or greater but 3 or less, where C represents a solubility parameter of an organic solvent of which proportion in the first ink is the highest except water, and D represents a solubility parameter of an organic solvent of which proportion in the second ink is the highest except water.

<7> The ink set according to any one of <1> to <6>,
wherein an absolute value of a difference between dynamic surface tensions of the first ink and the second ink measured by a maximum foaming pressure method in a life time of 1,500 ms is 0 mN/m or greater but 12 mN/m or less.

<8> The ink set according to any one of <1> to <7>,
wherein a shell resin of the hollow resin particles contains any one of a styrene-acrylic copolymer resin and a methyl methacrylate resin.

<9> The ink set according to any one of <1> to <7>,
wherein a proportion of the hollow resin particles is 5 percent by mass or greater but 12.5 percent by mass or less of a total amount of the first ink.

<10> A printing method including
forming an image using an ink set,
wherein the ink set includes:
a first ink that is white and contains water, hollow resin particles, and at least one organic solvent; and
a second ink that contains water and at least one organic solvent and is to be applied on a first image formed with the first ink to form a second image, and
wherein an average thickness difference (A–B) between an average thickness (A) of the first age before the second ink is applied and an average thickness (B) of a white region in the first image after the second image is formed is 1 μm or greater but 3 μm or less.

<11> The printing method according to <10>, further including:
a first heating step of heating the first image after the first ink is applied and before the second ink is applied; and
a second heating step of heating the second image after the second ink is applied,
wherein a heating temperature in the second heating step is 70 degrees C. or higher but 150 degrees C. or lower and is higher than or equal to a heating temperature in the first heating step.

<12> The printing method according to <11>,
wherein a heating time in the second heating step is 5 seconds or longer but 60 seconds or shorter and is longer than or equal to a heating time in the first heating step.

<13> The printing method according to any one of <10> to <12>,
wherein the average thickness (A) of the first image is 5 μm or greater but 50 μm or less.

<14> The printing method according to any one of <10> to <13>,
wherein a contact angle of the second ink on the first image is 15 degrees or greater but 30 degrees or less.

<15> The printing method according to any one of <10> to <14>,
wherein a solubility parameter (X) of a mixture solution of the at least one organic solvent and water contained in the first ink and a solubility parameter (Y) of a mixture solution of the at least one organic solvent and water contained in the second ink are 17.0 $(cal/cm^3)^{0.5}$ or greater but 20.2 $(cal/cm^3)^{0.5}$ or less.

<16> The printing method according to <15>,
wherein a solubility parameter difference (X–Y) between the solubility parameter (X) and the solubility parameter (Y) is −1 or greater but 3 or less.

<17> The printing method according to any one of <10> to <16>,
wherein a solubility parameter difference (C–D) is −3 or greater but 3 or less, where C represents a solubility parameter of an organic solvent of which proportion in the first ink is the highest except water, and D represents a solubility parameter of an organic solvent of which proportion in the second ink is the highest except water.

<18> The printing method according to any one of <10> to <17>,
wherein an absolute value of a difference between dynamic surface tensions of the first ink and the second ink measured by a maximum foaming pressure method in a life time of 1,500 ms is 0 mN/m or greater but 12 mN/m or less.

<19> The printing method according to any one of <10> to <18>,
wherein a shell resin of the hollow resin particles contains any one of a styrene-acrylic copolymer resin and a methyl methacrylate resin.
<20> The printing method according to any one of <10> to <19>,
wherein a proportion of the hollow resin particles is 5 percent by mass or greater but 12.5 percent by mass or less of a total amount of the first ink.
<21> A printing apparatus including:
an image forming unit configured to discharge the first ink and the second ink included in the ink set according to any one of <1> to <9>; and
a heating unit configured to heat the first image formed with the first ink and the second image formed with the second ink.
<22> A white ink including:
water;
hollow resin particles; and
at least one organic solvent,
wherein the white ink is used together with a second ink that is to be applied on a first image to form a second image, the first image being formed with the white ink,
wherein the second ink includes:
water; and
at least one organic solvent, and
wherein an average thickness difference (A−B) between an average thickness (A) of the first image before the second ink is applied and an average thickness (B) of a white region in the first image after the second image is formed is 1 μm or greater but 3 μm or less.
<23> An ink including:
water; and
at least one organic solvent,
wherein the ink is used together with a white first ink to form a first image on which a second image is to be formed, the second image being formed with the ink,
wherein the first ink includes:
water;
hollow resin particles; and
at least one organic solvent, and
wherein an average thickness difference (A−B) between an average thickness (A) of the first image before the ink to form the second image is applied and an average thickness (B) of a white region in the first image is after the second image is formed is 1 μm or greater but 3 μm or less.

The ink set according to any one of <1> to <9>, the printing method according to any one of <10> to <20>, the printing apparatus according to <21>, the white ink according to <22>, and the ink according to <23> can solve the various problems in the related art and can achieve the object of the present disclosure.

What is claimed is:

1. An ink set comprising:
a first ink that is white and comprises water, hollow resin particles, and at least one organic solvent, wherein the first ink forms a first image; and
a second ink that comprises water and at least one organic solvent and is to be applied on the first image formed with the first ink to form a second image,
wherein an average thickness difference (A−B) between an average thickness (A) of the first image before the second ink is applied and an average thickness (B) of a white region remaining in the first image after the second image is formed is 1 μm or greater but 3 μm or less.

2. The ink set according to claim 1, wherein the average thickness (A) of the first image is 5 μm or greater but 50 μm or less.

3. The ink set according to claim 1, wherein a contact angle of the second ink on the first image is 15 degrees or greater but 30 degrees or less.

4. The ink set according to claim 1, wherein a solubility parameter (X) of a mixture solution of the at least one organic solvent and water contained in the first ink and a solubility parameter (Y) of a mixture solution of the at least one organic solvent and water contained in the second ink are both 17.0 $(cal/cm^3)^{0.5}$ or greater but 20.2 $(cal/cm^3)^{0.5}$ or less.

5. The ink set according to claim 4, wherein a solubility parameter difference (X−Y) between the solubility parameter (X) and the solubility parameter (Y) is −1 or greater but 3 or less.

6. The ink set according to claim 1, wherein a solubility parameter difference (C−D) is −3 or greater but 3 or less, where C represents a solubility parameter of an organic solvent of which proportion in the first ink is highest except water, and D represents a solubility parameter of an organic solvent of which proportion in the second ink is highest except water.

7. The ink set according to claim 1, wherein an absolute value of a difference between dynamic surface tensions of the first ink and the second ink measured by a maximum foaming pressure method in a life time of 1,500 ms is 0 mN/m or greater but 12 mN/m or less.

8. The ink set according to claim 1, wherein a shell resin of the hollow resin particles comprises any one of a styrene-acrylic copolymer resin and a methyl methacrylate resin.

9. A printing method comprising
forming an image using an ink set, wherein the ink set comprises:
a first ink that is white and comprises water, hollow resin particles, and at least one organic solvent, wherein the first ink forms a first image; and
a second ink that comprises water and at least one organic solvent and is to be applied on the first image formed with the first ink to form a second image, and
wherein an average thickness difference (A−B) between an average thickness (A) of the first image before the second ink is applied and an average thickness (B) of a white region remaining in the first image after the second image is formed is 1 μm or greater but 3 μm or less.

10. The printing method according to claim 9, further comprising:
heating the first image after the first ink is applied and before the second ink is applied; and
heating the second image after the second ink is applied,
wherein a heating temperature in the heating the second image is 70 degrees C. or higher but 150 degrees C. or lower and is higher than or equal to a heating temperature in the heating the first image.

11. The printing method according to claim 10, wherein a heating time in the heating the second image is 5 seconds or longer but 60 seconds or shorter and is longer than or equal to a heating time in the heating the first image.

12. A printing apparatus comprising:
an image forming unit configured to discharge the first ink and the second ink in the ink set according to claim 1; and
a heating unit configured to heat the first image formed with the first ink and the second image formed with the second ink.

13. A white ink comprising:
water;
hollow resin particles; and
at least one organic solvent,
wherein the white ink is used together with a second ink that is to be applied on a first image to form a second image, the first image being formed with the white ink,
wherein the second ink comprises:
water; and
at least one organic solvent, and
wherein an average thickness difference (A−B) between an average thickness (A) of the first image before the second ink is applied and an average thickness (B) of a white region remaining in the first image after the second image is formed is 1 μm or greater but 3 μm or less.

14. The ink set according to claim 1, wherein a degree of hollowness of the hollow resin particles is from 20% to 80%, wherein the degree of hollowness is represented by formula (1):

$$\text{degree of hollowness (\%)} = (\text{internal capacity of hollow resin particle}/\text{capacity of hollow resin particle}) \times 100,$$

wherein
internal capacity of hollow resin particle=$4\pi/3 \times$(internal diameter of hollow resin particle)$^3$, and
capacity of hollow resin particle=$4\pi/3 \times$(external diameter of hollow resin particle)$^3$.

\* \* \* \* \*